United States Patent
Fukushima et al.

(10) Patent No.: US 7,986,320 B2
(45) Date of Patent: Jul. 26, 2011

(54) 3D IMAGE DISPLAYING METHOD AND APPARATUS

(75) Inventors: Rieko Fukushima, Tokyo (JP); Yuzo Hirayama, Kanagawa (JP); Miwako Doi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 826 days.

(21) Appl. No.: 11/898,149

(22) Filed: Sep. 10, 2007

(65) Prior Publication Data

US 2008/0079660 A1    Apr. 3, 2008

(30) Foreign Application Priority Data

Sep. 28, 2006   (JP) ................................ 2006-265098

(51) Int. Cl.
G06T 15/00 (2006.01)
(52) U.S. Cl. ............................ 345/419; 345/7; 382/154
(58) Field of Classification Search .............. 345/7, 419; 382/154

See application file for complete search history.

(56) References Cited

U.S. PATENT DOCUMENTS

| | | | |
|---|---|---|---|
| 5,999,185 A | 12/1999 | Kato et al. | |
| 6,614,427 B1 * | 9/2003 | Aubrey | 345/419 |
| 6,728,636 B2 | 4/2004 | Kokojima et al. | |
| 7,596,259 B2 * | 9/2009 | Tooyama et al. | 382/154 |
| 7,680,322 B2 * | 3/2010 | Tooyama et al. | 382/154 |
| 2004/0208358 A1 * | 10/2004 | Tooyama et al. | 382/154 |
| 2005/0259323 A1 | 11/2005 | Fukushima et al. | |

FOREIGN PATENT DOCUMENTS

| | | |
|---|---|---|
| JP | 2001-331169 | 11/2001 |
| JP | 2004-198971 | 7/2004 |
| JP | 2005-230139 | 9/2005 |
| JP | 2005-258421 | 9/2005 |
| JP | 2006-293931 | 10/2006 |

OTHER PUBLICATIONS

U.S. Appl. No. 10/581,363, filed Jun. 2, 2006, to Fukushima et al.
European Search Report issued by the EPO on Jan. 16, 2008, for European Patent Application No. 07253603.0.
Lippmann; Comptes Rendus de l'Académie des Sciences, vol. 146(9), pp. 446-451, (1908).
Hoshino et al.; "Analysis of Resolution Limitation of Integral Photography",J. Opt. Soc. Am. A., vol. 15, No. 8, pp. 2059-2065, (1998).
Saishu et al.; "53.3: Distortion Control in a One-Dimensional Integral Imaging Autosteroscopic Display System With Parallel Optical Beam Groups", SID 04' Digest, pp. 1438-1441, (2004).
Office Action issued by the Japanese Patent Office on Aug. 26, 2008, for Japanese Patent Application No. 2006-265098, and Partial English Translation thereof.
Hirayama, "Flatbed-Type Autostereoscopic Display System," Optics (Aug. 2006), 35:416-422.

* cited by examiner

*Primary Examiner* — Alexander Eisen
*Assistant Examiner* — Viet Pham
(74) *Attorney, Agent, or Firm* — Finnegan, Henderson, Farabow, Garrett & Dunner, L.L.P.

(57) ABSTRACT

A method of displaying 3D image on a 3D image displaying apparatus that produces a parallax at least in one direction, the method includes displaying by a displaying unit 2D information that is viewed as a 2D content by a viewer in such a manner that a 2D information angle ($\theta\_2D$) formed with a virtual display surface of the 2D information and a real horizontal plane satisfies $\theta\_D < \theta\_2D \leq 90°$, wherein a display surface is arranged at an angle ($\theta\_D$) formed with the real horizontal plane in a real space, where $0° \leq \theta\_D < 90°$.

17 Claims, 18 Drawing Sheets

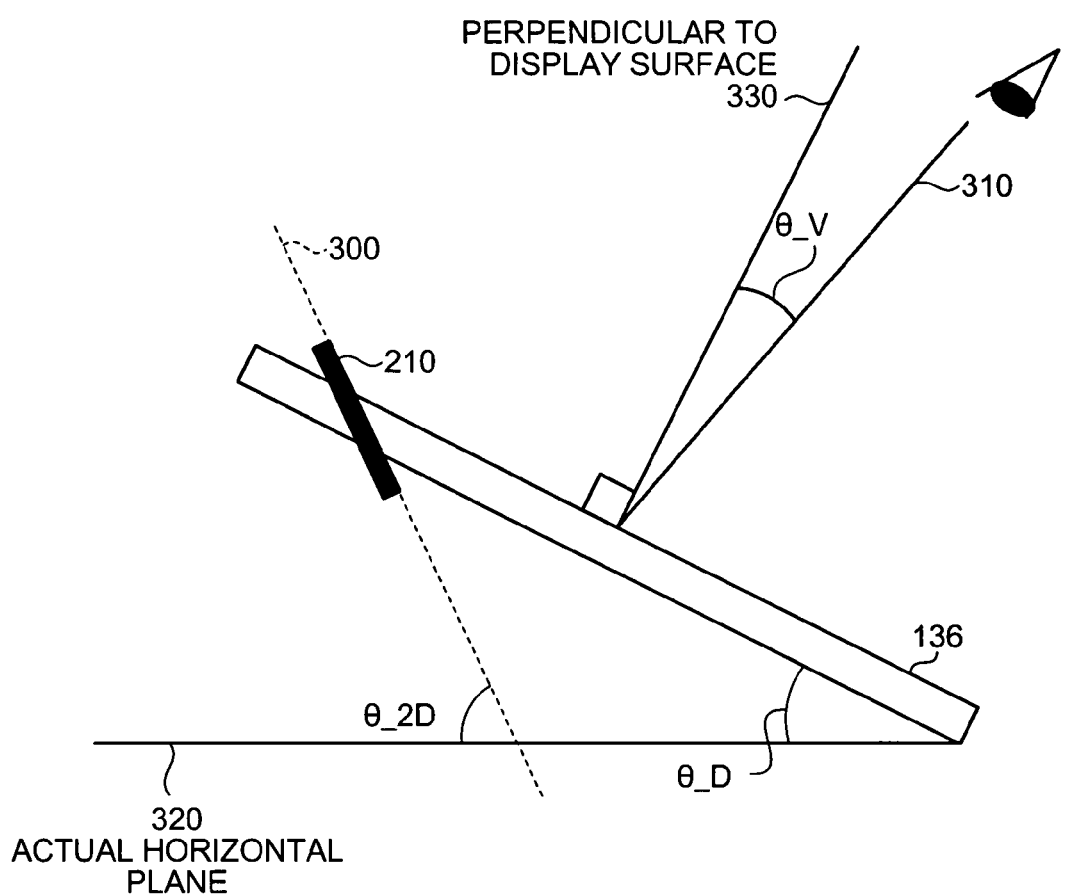

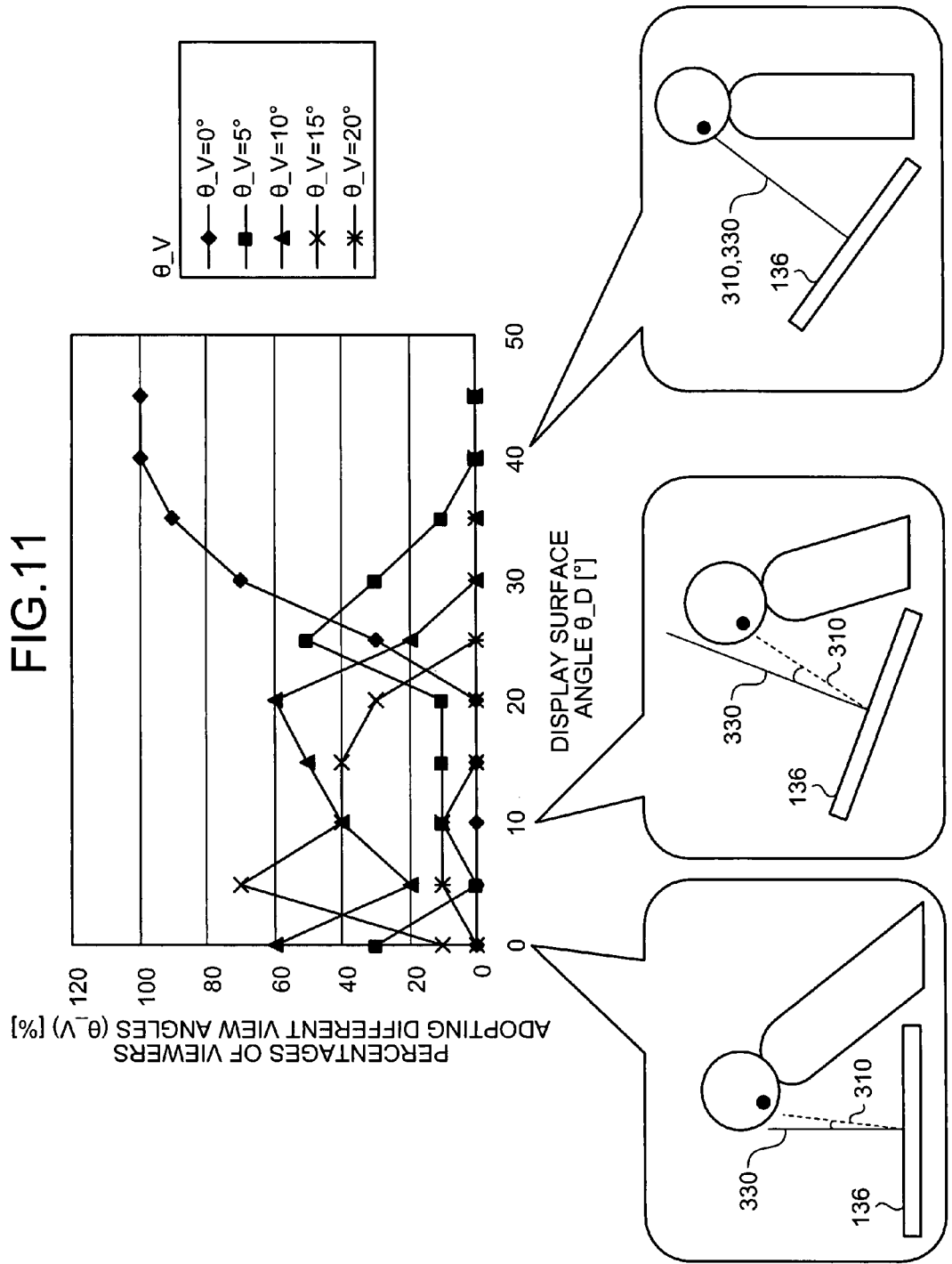

3D IMAGE DISPLAYING METHOD AND APPARATUS

CROSS-REFERENCE TO RELATED APPLICATIONS

This application is based upon and claims the benefit of priority from the prior Japanese Patent Application No. 2006-265098, filed on Sep. 28, 2006; the entire contents of which are incorporated herein by reference.

BACKGROUND OF THE INVENTION

1. Field of the Invention

The present invention relates to a 3D (three dimensional) image displaying method for a 3D image displaying apparatus which produces a parallax at least in one direction, and such a 3D image displaying apparatus.

2. Description of the Related Art

A 3D image displaying method without the need for special viewing glasses includes stereo-view and multi-view types. In both type systems, a lenticular sheet (array of semi-circular lenses that have a lens property in a horizontal direction only) or a parallax barrier is provided on the display surface, and 2D information that includes a parallax is presented independently to the left and right eyes. The viewer thereby perceives a 3D image.

With the stereo-view system, two pieces of 2D information is offered so that a viewer perceives a 3D image from a viewpoint in a single direction. With the multi-view system, four pieces of 2D information are used, for example, so that a viewer perceives a 3D image from viewpoints in three directions. In other words, a phenomenon called motion parallax in which an object moves in a direction opposite to the motion of the body is presented to the viewer, although the movement of the object is not continuous.

Integral imaging (II) is a system that makes improvements in the motion parallax and displays a 3D image that involves the motion parallax. This system is based on a system called integral photography (IP) for taking and reproducing a 3D photograph, which was proposed on 1908 (e.g., M. G. Lippmann, Comptes Rendus de l'Academie des Sciences, Vol. 146, pp. 446-451 (1908), IP). In this system, a lens array that corresponds to pixels of a 3D photograph is prepared, and photographing is conducted with a film placed at the focal length of the array. When reproducing, the lens array that is used for photographing is placed on the film.

The process of reproducing the optical information recorded through a lens only by reversing the proceeding direction means that it does not limit the viewing position. Moreover, if the resolution of the film is sufficient enough, a perfect aerial image can be reproduced in a similar manner to holography. Thus, the II system is an ideal system. A 3D image displaying apparatus of the II system adopts a liquid display (LCD), which is a common flat panel display, in place of film.

The course of the light emitted from the pixels is regulated so that the light is projected as a beam. As the number of pixels behind the lens increases, or in other words the number of pieces of parallax information (image information that changes in appearance depending on the view angle) increases, the display range in front of or the back of the 3D image displaying apparatus becomes larger. However, the resolution of the 3D image is lowered under a condition that the resolution of the LCD is unchanged, because the lens pitch is increased (e.g., H. Hoshino, F. Okano, H. Isono, and I. Yuyama, J. Opt. Soc. Am. A., Vol. 15, pp. 2059-2065 (1998), NHK).

The II system is featured in that the number of parallaxes is increased to the extent possible, while giving consideration to the decreasing fineness of the viewpoint image. Moreover, the position of the viewer is not limited when designing the beaming system (i.e., the light focusing points are not specially arranged at the positions of the viewer's eyes). This clearly differentiates the II system from the multi-view system, where 3D image perception is realized by setting the number of parallaxes to two to four to prevent the fineness of the viewpoint image from being lowered, and providing the light focusing points at positions corresponding to the eyes of the viewer.

More specifically, the horizontal lens pitch or an integral multiple of the horizontal lens pitch is designed to match an integral multiple of the horizontal pixel pitch. This makes the beams projected from the lenses substantially parallel to one another so that the beams would not gather at a certain point in the reproduction and observation space. Otherwise, a method may be adopted, with which the light focusing point is designed far beyond the viewing distance. These beams are reproduced, based on the discretely extracted light that was given out from the surface of the object that really existed there. Thus, if a large number of parallaxes are provided, the viewer can perceive a binocular viewpoint image within the viewable range that should be seen from around the viewer's position. Furthermore, continuous motion parallax can be obtained.

In essence, the only difference between the 1D-II and multi-view systems resides in the restriction on the layout of beams due to the limited number of pixels of a flat panel such as an LCD. Unlike the multi-view system, however, in which emphasis on the fineness of the viewpoint image results in incomplete motion parallax, the 1D-II system that does not have any specific light focusing point offers a more natural and less tiring 3D image in which binocular parallax and motion parallax are well balanced.

However, there is a restriction on the display in the depth direction of the 3D image displaying apparatus of each type. First, in the 3D image displaying apparatus of the II system, the display is limited in its depth direction because the distance between pieces of the parallax information that are presented becomes larger as the viewer is situated farther away from the display surface (e.g., H. Hoshino, F. Okano, H. Isono, and I. Yuyama, J. Opt. Soc. Am. A., Vol. 15, pp. 2059-2065 (1998), NHK). As for the multi-view system, the 3D image could be multiplexed if multiple pixels are simultaneously viewed through the lenses. To avoid this, a restriction should be placed on the depth of the display to the extent similar to the II system. For the stereo-view system, there is a restriction on the depth of the display to solve the problem of fatigue caused by incoherence of vergence accommodation. In other words, whichever display system is chosen, the display range is limited to plus or minus several centimeters. To present a realistic 3D image in the limited display range, a flatbed-type display may be adopted.

In comparison to the upright type, the flatbed type can shorten the distance from the 3D image displaying apparatus to the viewer without making the viewer aware of this. To the human's eyes, 10 centimeters in immediate proximity presents more spatial effect than 10 centimeters at a distance. The flatbed type, which is positioned closer to the viewer, can bring about excellent spatial effect.

In addition, the 3D image displaying apparatus of the flatbed type situated in such a manner that the viewer looks down at it has a display range that corresponds to the area where manual works are performed. It is reported that, when handling an object, a human subconsciously uses body parts of one's own, such as the palm, as a reference size. The average male's palm is about 9 centimeters wide. This means that an approximately 10-centimeter-high 3D image within a manual work range would bring about sufficient spatial effect.

Furthermore, as can be seen from objects on a desk, an object that is floated above the reference plane or an object extremely tall with respect to the floor area tend to be limited.

In addition, a human seems to focus on projections and depressions more on the lower side than in front. It is considered that evolution of any creature proceeds in a direction of obtaining information that means more to the self at a higher sensitivity. It is assumed that, in the history of human beings, vertical projections and depressions such as those at hand when performing hand works and those under one's feet, which may lead directly to toppling, misstep, and other accidents, have meant more than horizontal projections and depressions.

For the above reasons, a human seems to have a higher sensitivity toward vertical projections and depressions than toward horizontal projections and depressions, and thus it can be assumed that a flatbed-type device increases the value of stereoscopic information and improves the impact of a 3D image.

In addition, a flatbed-type or almost-flatbed-type 3D image displaying apparatus that displays 2D information such as characters and icons, as well as 3D images, has been suggested (e.g., Japanese JP-A 2001-331169 (KOKAI)).

The 3D image displaying apparatus with its display surface designed to be substantially horizontal can display a 3D image that has spatial effect. It is preferable for the device to be capable of more effectively and impressively displaying 2D information as well.

SUMMARY OF THE INVENTION

According to one aspect of the present invention, a method of displaying 3D image on a 3D image displaying apparatus that produces a parallax at least in one direction, the method includes displaying by a displaying unit 2D information that is viewed as a 2D content by a viewer in such a manner that a 2D information angle ($\theta\_2D$) formed with a virtual display surface of the 2D information and a real horizontal plane satisfies: $\theta\_D<\theta\_2D\leq90°$, wherein a display surface is arranged at an angle ($\theta\_D$) formed with the real horizontal plane in a real space, where $0°\leq\theta\_D<90°$.

According to another aspect of the present invention, a 3D image displaying apparatus that produces a parallax at least in one direction, the apparatus includes a display surface that is arranged at an angle ($\theta\_D$) formed with a real horizontal plane in a real space, where $0°\leq\theta\_D<90°$; and a displaying unit that displays 2D information that is viewed as a 2D content by a viewer in such a manner that a 2D information angle ($\theta\_2D$) formed with a virtual display surface of the 2D information and the real horizontal plane satisfies: $\theta\_D<\theta\_2D\leq90°$.

BRIEF DESCRIPTION OF THE DRAWINGS

FIG. 8 is a diagram for explaining a relationship between the display surface 136 and 2D information 210;

FIG. 11 is a diagram for explaining the relationship between a display surface angle ($\theta\_D$) and the view angle ($\theta\_V$);

DETAILED DESCRIPTION OF THE INVENTION

Exemplary embodiments of a 3D image displaying method and a 3D image displaying apparatus according to the present invention are explained in details below with reference to the drawings. The present invention should not be limited by these embodiments, however.

Figure 1:
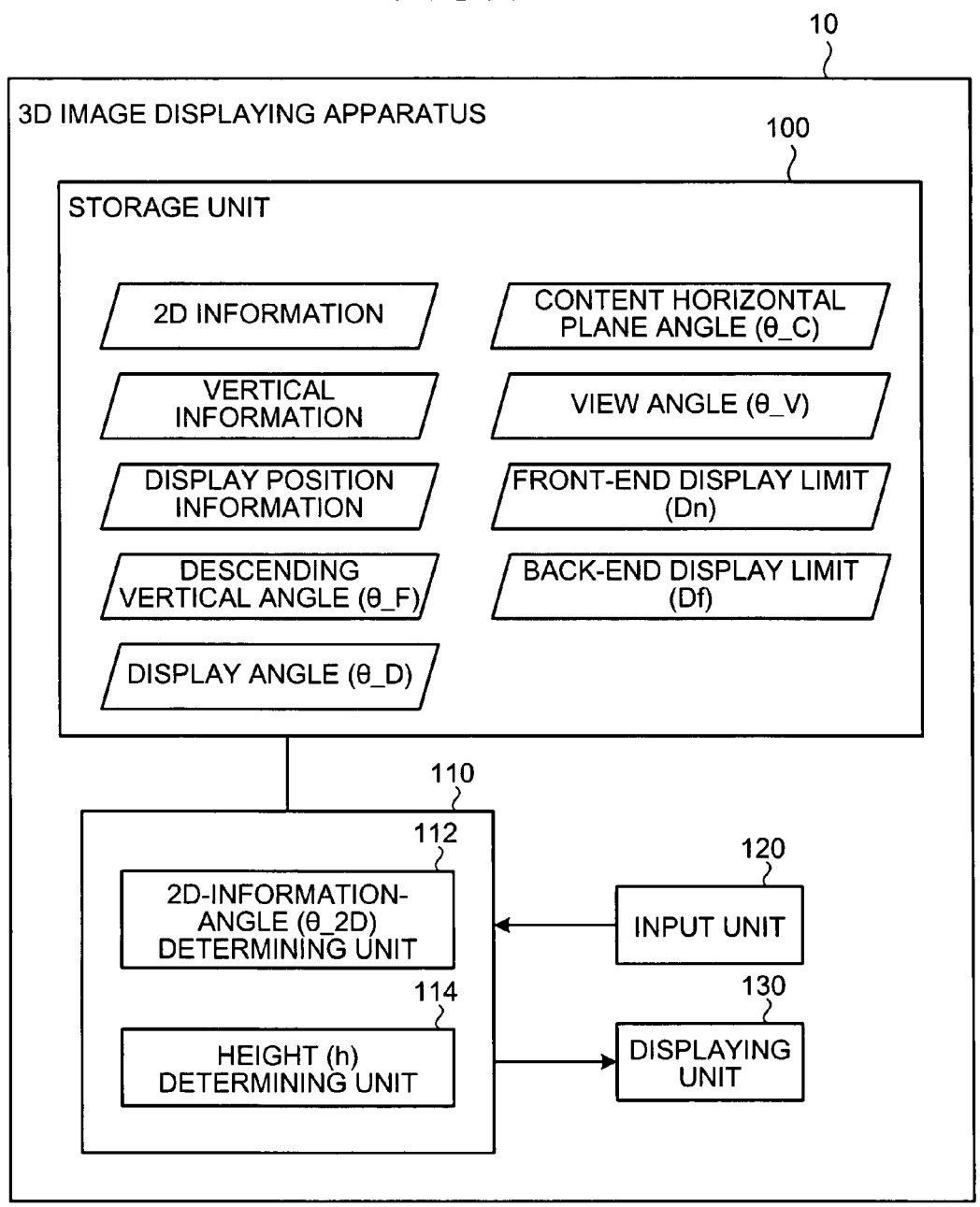
FIG. 1 is a diagram showing a functional structure of a 3D image displaying apparatus according to an embodiment of the present invention.

A 3D image displaying apparatus 10 according to an embodiment displays 2D information on a virtual plane in a 3D space, as illustrated in FIG. 1. The 2D information here means information that is presented in two dimensions, which includes characters and icons, for example. When a map image is displayed as a 3D image, for instance, 2D information such as icons for recognizing names of places and buildings are superposed on the map image.

As main components for the function of displaying the 2D information on the virtual plane, the 3D image displaying apparatus 10 includes a storage unit 100, a processing unit 110, an input unit 120, and a displaying unit 130. The input unit 120 receives various kinds of information input by a user. The received information is stored in the storage unit 100. The displaying unit 130 displays 3D images and 2D information.

The storage unit 100 stores therein the 2D information and the 3D images that are to be displayed on the displaying unit 130. The storage unit 100 also stores therein information necessary to determine a 2D information angle ($\theta\_2D$) for displaying the 2D information. More specifically, a descending vertical angle ($\theta\_F$), a display angle ($\theta\_D$), a content horizontal plane angle ($\theta\_C$), a view angle ($\theta\_V$), a front-end display limit (Dn), and a back-end display limit (Df) are stored. If the 2D information includes any motion, display position information that indicates the position for displaying the 2D information is also stored. If the 3D information includes any motion and changes in height, the height is stored. Such information and angles will be discussed later.

The processing unit 110 controls the arrangement of the 2D information so that the 2D information is displayed on the displaying unit 130 at an angle easy for the viewer to recognize. The processing unit 110 includes a 2D-information-angle ($\theta\_2D$) determining unit 112 and a height (h) determining unit 114.

The 2D-information-angle ($\theta\_2D$) determining unit 112 determines the 2D information angle ($\theta\_2D$) of the 2D information that is to be displayed on the displaying unit 130, with reference to the information stored in the storage unit 100. The 2D-information-angle ($\theta\_2D$) determining unit 112 further determines the 2D information angle ($\theta\_2D$) that satisfies display conditions, which will be discussed later. When there is more than one 2D information angle ($\theta\_2D$) that satisfies the display conditions, any one of the values can be determined as the 2D information angle ($\theta\_2D$). When the 2D information includes some motion on the display surface, the 2D-information-angle ($\theta\_2D$) determining unit 112 determines the 2D information angle ($\theta\_2D$) in accordance with the display position of the 2D information.

The height (h) determining unit 114 determines the height (h) of the 2D information in accordance with the display position of the 2D information. Similarly, the height (h) determining unit 114 determines the height (h) of the 3D information in accordance with the display position of the 3D information.

Figure 2:
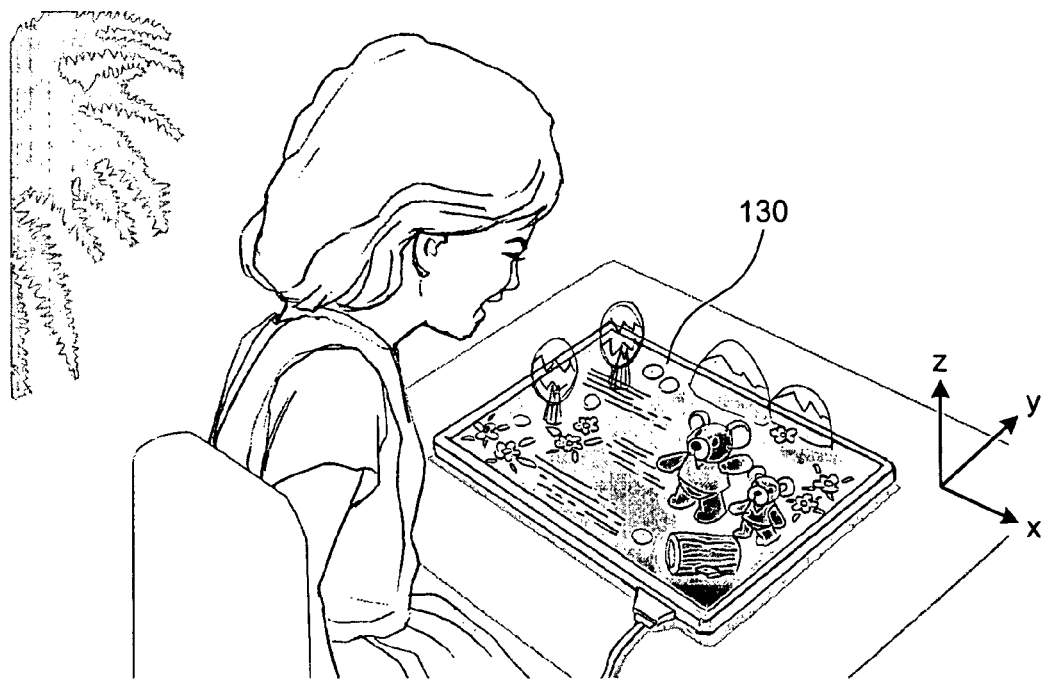
FIG. 2 is a diagram showing the external appearance of a displaying unit.

As illustrated in FIG. 2, the displaying unit 130 is of a flatbed type, and thus the display surface is arranged in parallel with the actual horizontal surface, which is the horizontal surface in real space. Suppose the width direction of the displaying unit 130 is the x direction where a movement toward the right is in the positive direction, and the height direction of the displaying unit 130 is the y direction where a movement upward the top is in the positive direction. The direction perpendicular to the surface of the displaying unit 130 is the z direction where a movement toward the front of the displaying unit 130 or, in other words, toward the viewer is in the positive direction.

The displaying unit 130 may be placed with its display surface slightly tilted down toward the viewer, with respect to the real horizontal surface.

Figure 3:
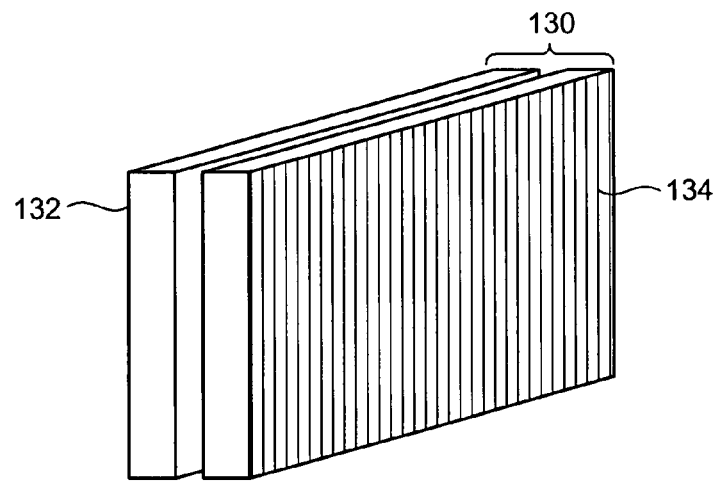
FIG. 3 is a diagram showing the detailed structure of the displaying unit.

As illustrated in FIG. 3, the displaying unit 130 includes a 2D information display panel 132 and an optical control element 134. The 2D information display panel 132 is a liquid crystal display (LCD). Each pixel in the 2D information display panel 132 consists of three sub-pixels related to R, G, and B components. More specifically, the 2D information display panel 132 is a WUXGA-LCD for use in displaying 2D information. The optical control element 134 is a lenticular sheet.

A lens array may be used in place of the lenticular sheet. The lenticular sheet does not have a lens effect in the vertical direction and thus cannot present parallax information in this direction. In contrast, the lens array can present parallax information in the vertical direction as well as the horizontal direction. For convenience of explanation, however, the presentation of parallax only in the horizontal direction will be discussed here.

Figure 4:
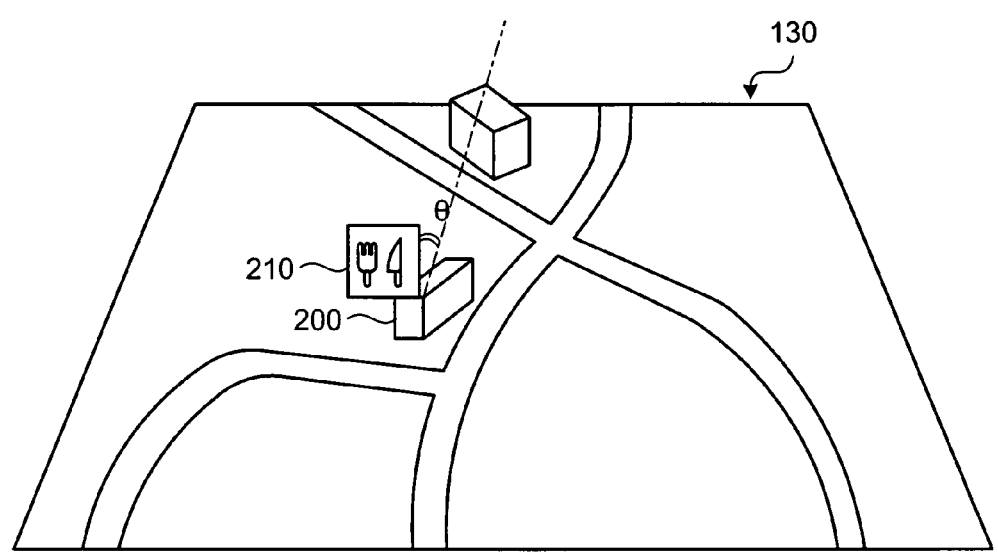
FIG. 4 is a diagram for explaining a relationship between 2D information and a 3D image.

As illustrated in FIG. 4, a viewer of the displaying unit 130 sees an image displayed thereon as a 3D image. The 3D image such as a solid object 200 is viewed in three dimensions. On the other hand, an icon 210 that is 2D information is presented on a virtual plane that forms a certain angle ($\theta$) with a virtual horizontal plane.

Figure 5A:
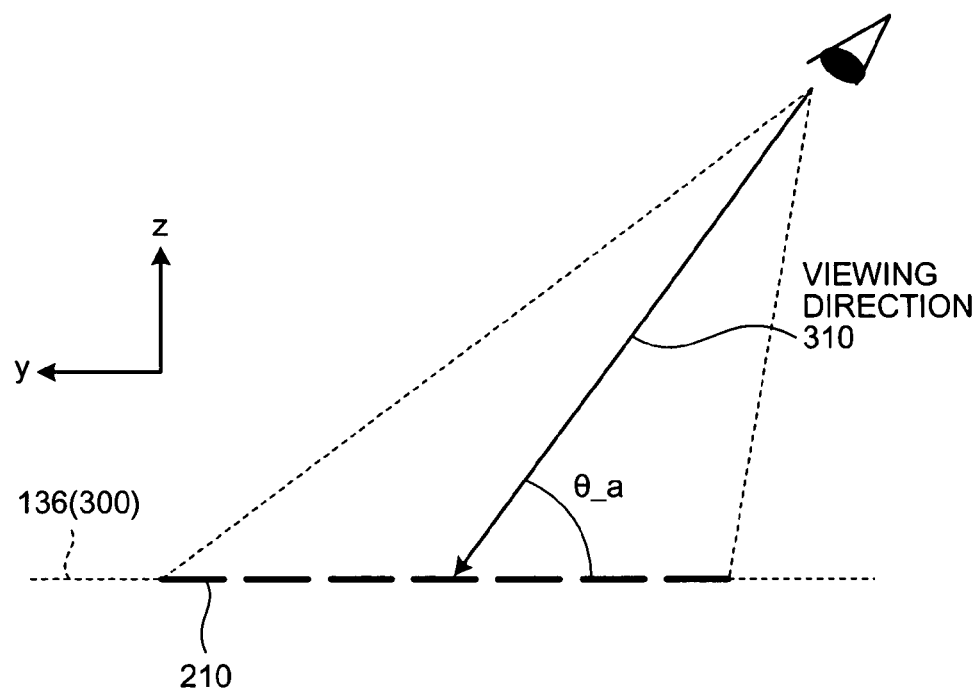
FIG. 5A is a diagram showing the 2D information arranged in such a manner that a virtual plane 300 on which the 2D information is displayed is parallel to a display surface 136 of the displaying unit 130.
Figure 5B:
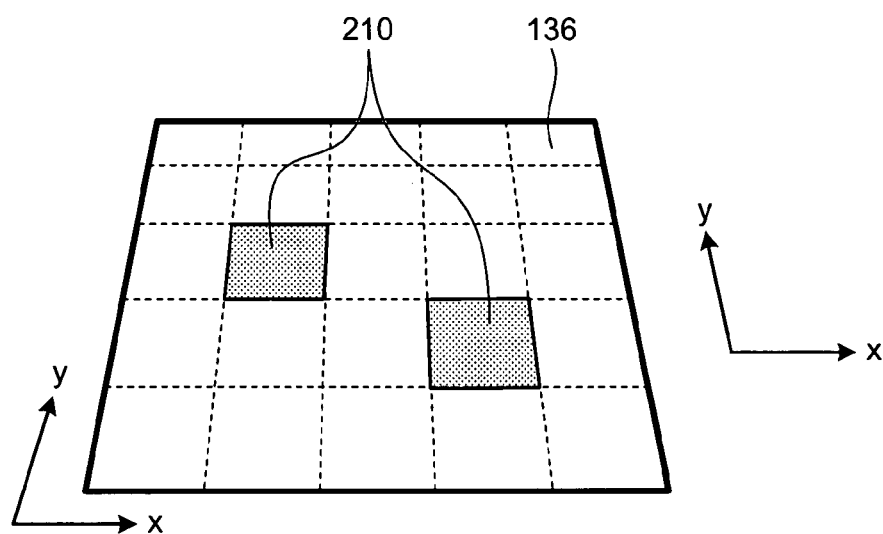
FIG. 5B is a diagram showing the 2D information arranged in such a manner that the virtual plane 300 on which the 2D information is displayed is parallel to the display surface 136 of the displaying unit 130.

The relationship between the virtual plane on which the 2D information is displayed and the display surface of the displaying unit 130 is explained. In FIGS. 5A and 5B, the 2D information is displayed in such a manner that the virtual plane 300 on which the 2D information is displayed is arranged in parallel with the display surface 136 of the displaying unit 130. The display surface 136 is parallel with an x-y plane.

In the example of FIG. 5A, the 2D information 210 is arranged in parallel with the x-y plane of the displaying unit 130, or in other words, the display surface 136.

FIG. 5B is a diagram showing the 2D information 210 positioned as indicated in FIG. 5A that is viewed from the viewer's eyes. Because in many cases the 2D information such as characters and icons is constituted with perpendicular and parallel components, the 2D information 210 is represented as a rectangle formed of perpendicular and parallel components, for convenience of explanation.

When the 2D information 210 is positioned in parallel with the display surface 136, the display surface 136 and the virtual plane 300 extend in parallel so that the 2D information 210 is viewed as if it is positioned on the display surface 136. In other words, an angle ($\theta\_a$) formed with a viewing direction 310 from the viewer and the virtual plane 300 is smaller than 90°.

Figure 6A:
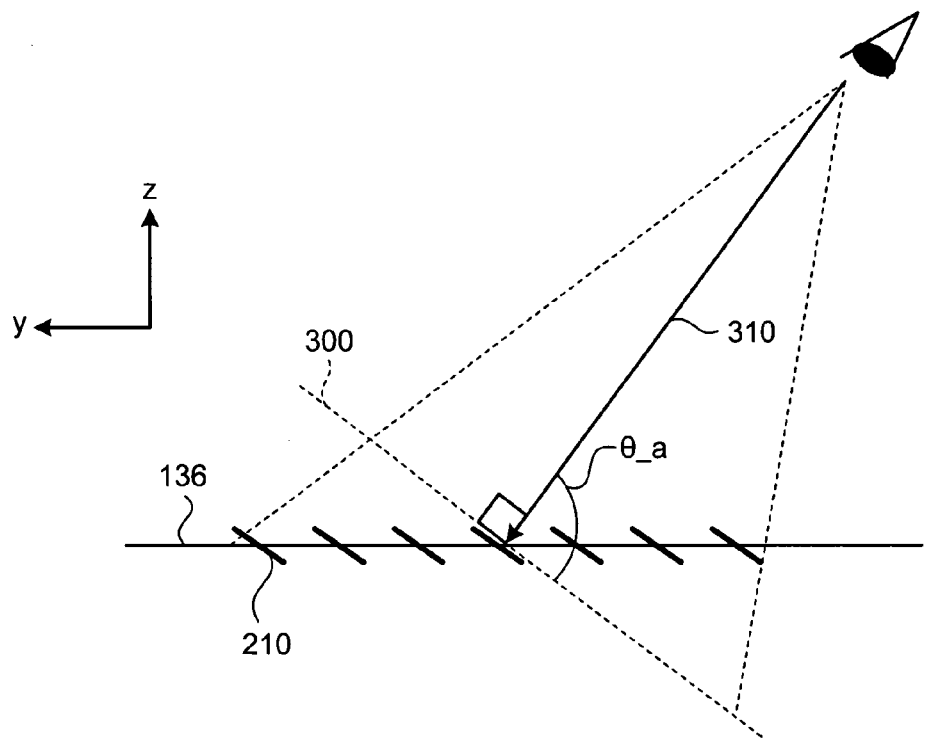
FIG. 6A is a diagram showing an example of the 2D information arranged in such a manner that an angle ($\theta\_a$) formed by the virtual plane 300 and the display surface 136 is 90°.
Figure 6B:
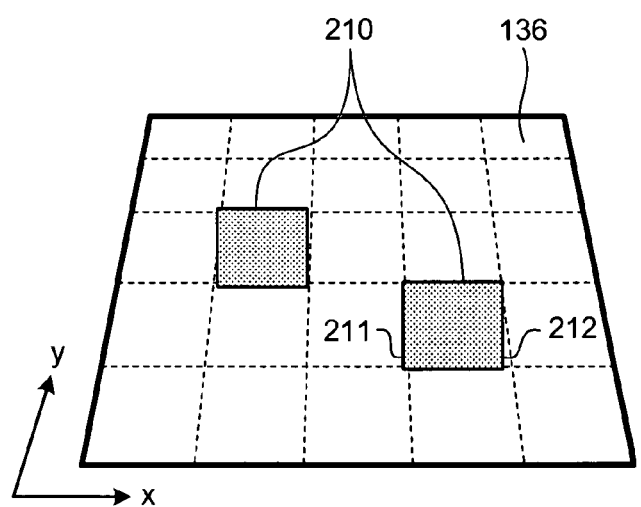
FIG. 6B is a diagram showing an example of the 2D information arranged in such a manner that an angle ($\theta\_a$) formed by the virtual plane 300 and the display surface 136 is 90°.

FIG. 6A is a cross section of the displaying unit 130 viewed from the x direction. FIG. 6B is a diagram showing the 2D information 210 positioned as indicated in FIG. 6A that is viewed from the viewer's eyes. Left and right sides 211 and 212 of the 2D information 210 are angled with respect to the grid of the display surface 136. In other words, the top side of the 2D information 210 is raised in the z direction. Thus, the viewer perceives the 2D information 210 of FIG. 6B with a more spatial effect than the 2D information 210 of FIG. 5B.

Figure 7A:
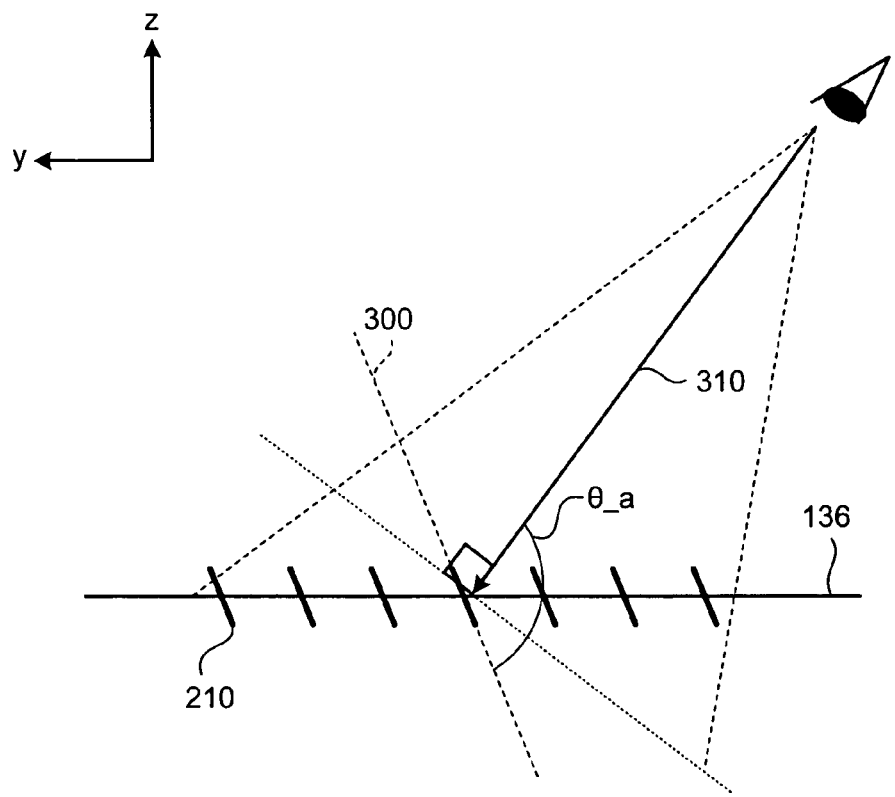
FIG. 7A is a diagram showing an example of the 2D information arranged in such a manner that an angle ($\theta\_a$) formed by the virtual plane 300 and the display surface 136 is greater than 90°.
Figure 7B:
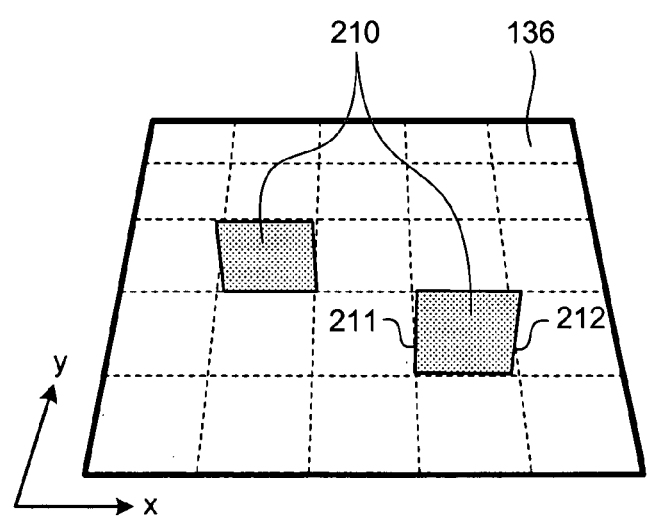
FIG. 7B is a diagram showing an example of the 2D information arranged in such a manner that an angle ($\theta\_a$) formed by the virtual plane 300 and the display surface 136 is greater than 90°.

In the example shown in FIGS. 7A and 7B, the left and right sides 211 and 212 are angled with respect to the grid of the display surface 136. In the example in FIG. 6B, the left side 211 and the right side 212 run in parallel with each other. On the other hand, in the example in FIG. 7B, the left side 211 and the right side 212 are angled with respect to each other. Such arranged left side 211 and right side 212 significantly help the viewer understand the depth information. Hence, the example in FIG. 7B gives the viewer the impression that the information is presented more toward the viewer, than in the example in FIG. 6B.

The 3D image displaying apparatus 10 uses parameters stored in the storage unit 100 to present the 2D information to the viewer in a raised manner as illustrated in FIGS. 6B and 7B. The display conditions that the 2D-information-angle (θ_2D) determining unit 112 uses to determine the 2D information angle (θ_2D) are described below. FIG. 8 is a diagram for explaining the relationship between the display surface 136 and the 2D information 210.

The angle formed by the display surface 136 and an actual horizontal plane 320 is referred to as a display surface angle (θ_D). The angled formed by the actual horizontal plane 320 and the virtual plane 300 is referred to as a 2D information angle (θ_2D). The angle formed by a perpendicular 330 dropped to the display surface 136 and the viewing direction 310 is referred to as a view angle (θ_V). Then, the display condition for producing the effect as indicated in FIG. 6B can be expressed by (1):

$$\theta\_D < \theta\_2D \leq 90 (0° \leq \theta\_D < 90°) \qquad (1)$$

To produce the effect as indicated in FIG. 7B, the display condition expressed by (2) should be met in addition to the condition (1):

$$\theta\_D + \theta\_V \leq \theta\_2D (0° < \theta\_V < 90°) \qquad (2)$$

Figure 9:
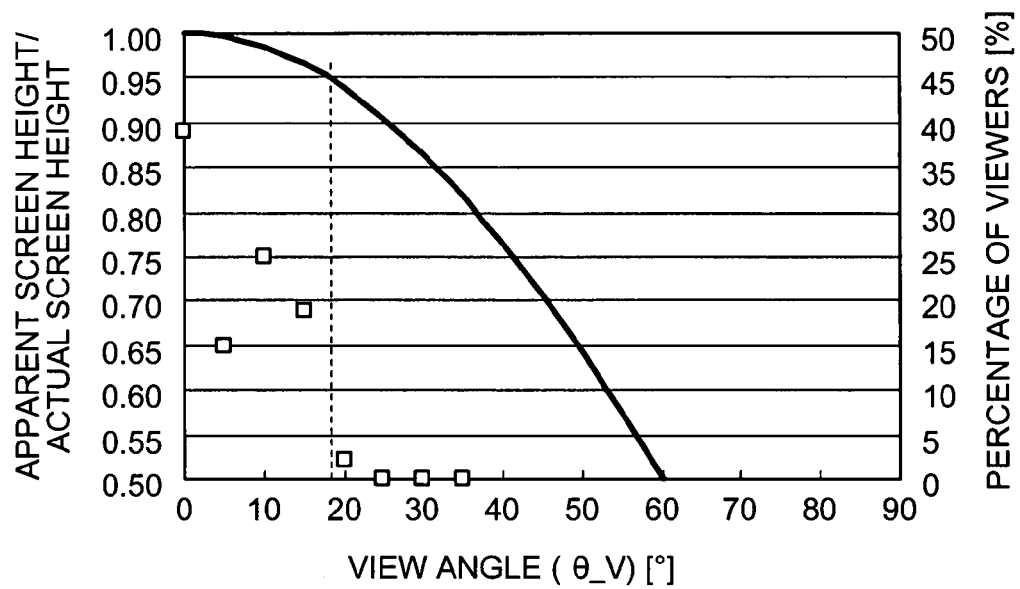
FIG. 9 is a diagram for explaining a relationship between a view angle ($\theta\_V$) and the ratio of the apparent height of a screen to the actual height of the screen.

The relationship between the view angle (θ_V) and the ratio of the apparent screen height to the actual screen height is explained next. FIG. 9 is a diagram for explaining the relationship between the view angle (θ_V) and the ratio of the apparent screen height to the actual screen height (left axis of FIG. 9).

Figure 10A:
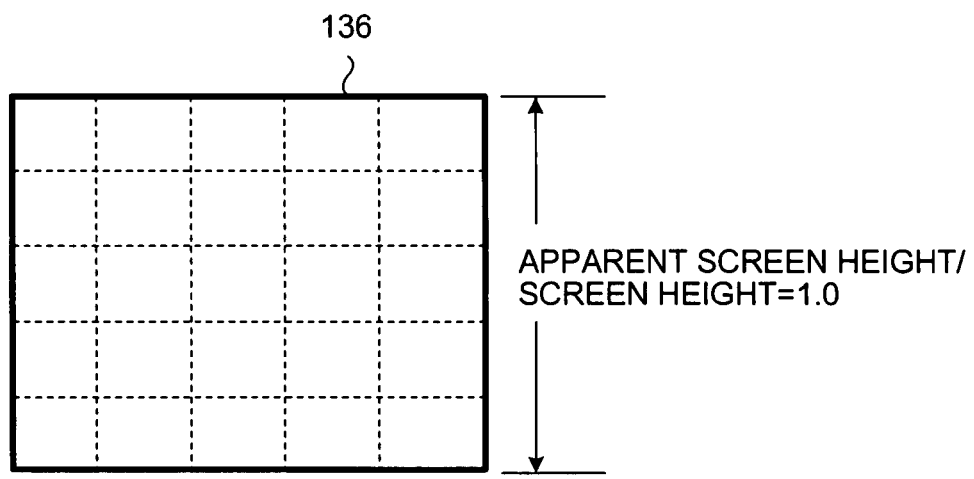
FIG. 10A is a diagram for explaining the apparent height of the screen.
Figure 10B:
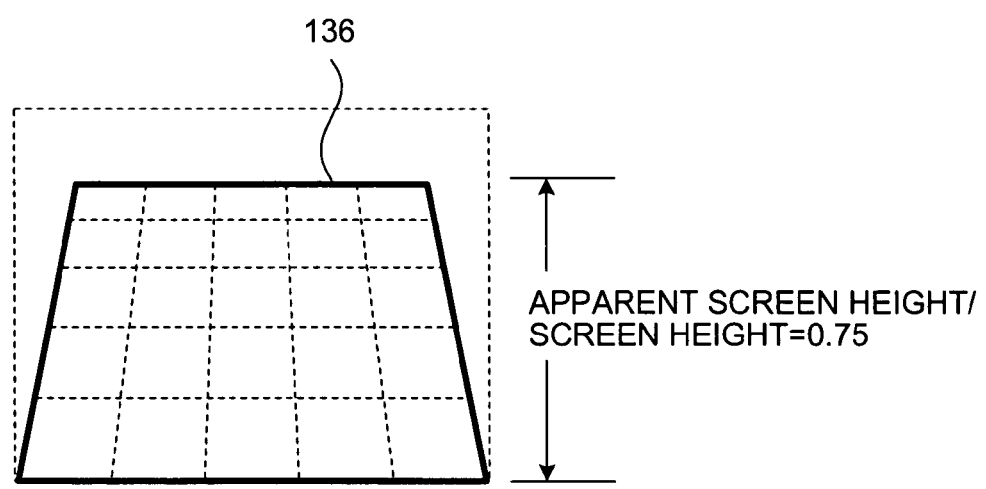
FIG. 10B is a diagram for explaining the apparent height of the screen.

In FIG. 10A, the apparent screen height is set to the same length as the actual screen height. When the display surface 136 is placed in a position perpendicular to the viewing direction 310, the viewer recognizes it as having the actual screen height. However, as the angle formed by the display surface 136 and the viewing direction 310 is deviated more from 90°, the screen is perceived as being shorter. The height of the screen by appearance is referred to as an apparent screen height.

The relationship between the view angle (θ_V) and the percentage of viewers who look at the display surface 136 at each angle is also indicated in FIG. 9 (right axis of FIG. 9). The display surface 136 is positioned by changing the display surface angle (θ_D) every 5° from 0°, where the display surface 136 is in parallel to the actual vertical plane in a flatbed manner, to 90°, and the postures of the viewers at each angle are measured. The 3D image displaying apparatus 10 is placed on a 70-centimeter high table. Viewers are asked to either sit on a chair or stand on one's feet during viewing.

In FIG. 9, the percentage of people who have taken a look at each view angle (θ_V), regardless of the display surface angle (θ_D), is indicated. The view angles (θ_V) are rounded off to the nearest multiples of 5°. The percentages of people who adopt the view angle (θ_V) between 0° and 15° are considerably high. In contrast, the percentage drops at the view angle (θ_V) of 20°, and no one adopts the view angle (θ_V) of 25°.

The reason that the view angle (θ_V) of 15° or smaller is preferred by the viewers may be explained by the apparent screen height of the display surface that is expressed by a cosine function of the view angle (θ_V). The ratio of the apparent screen height to the actual screen height is 98% at the view angle (θ_V) around 10°. In other words, 98% of the screen height is maintained. On the other hand, the ratio decreases to 95% at the view angle (θ_V) of 18.2°. Furthermore, the ratio becomes 94% at the view angle (θ_V) of 20°, and drops below 90% at the view angle (θ_V) of 25.8°, which clearly lowers the apparent screen height.

The fact that nobody adopts the view angle (θ_V) larger than 25° may be attributed to this apparent screen height. When recognizing the shortened screen height, the viewer may change one's posture toward the front (with the head bent forward) so that the screen can be used fully to the limit of size. Hence, the display condition (3) should be satisfied for a natural posture of the viewer when observing the 2D information:

$$0° < \theta\_V < 25° \qquad (3)$$

The display condition based on the relationship between the display surface angle (θ_D) and the view angle (θ_V) is explained next. FIG. 11 is a diagram for explaining the relationship between the display surface angle (θ_D) and the view angle (θ_V). The percentages of people adopting the view angles (θ_V) between 0° and 20° when the display surface angle is (θ_D) are calculated. The percentages for θ_V=15° and 20° reach their peaks when θ_D=5°. The percentage for θ_V=10° reaches its peaks when θ_D=20°, while the percentage for θ_V=5° reaches its peaks when θ_D=25°. The percentage for θ_V=0° increases as θ_D becomes closer to 45°.

In light of the above results, it is found that the view angle (θ_V) tends to be large when the display surface angle (θ_D) is small. In contrast, when the display surface angle (θ_D) is large, the view angle (θ_V) tends to be small. In other words, as the display surface angle (θ_D) increases so that the display surface 136 faces toward the viewer, the view angle (θ_V) becomes small.

However, this does not hold when the display surface angle (θ_D) is 0°. The view angle (θ_V) becomes small in this case. This may be because the display surface 136 does not face the viewer at all when the display surface angle (θ_D) is 0° so that the viewer voluntarily comes to face straight toward the display surface, bending the head down.

When θ_D≧5°, the display surface slightly faces the viewer. For this reason, the viewer recognizes that the display is presented toward oneself, and does not feel necessary to take an action of changing the posture and facing the display in front. Furthermore, as θ_D becomes closer to 45°, the display can be viewed from the front, even by keeping an upright posture.

In accordance with such a relationship, the display surface angle (θ_D) should be determined by the expression (4) to be suitable for the assumed view angle (θ_V).

$$\theta\_D + \theta\_V \leq \theta\_2D (0° < \theta\_V < 25°) \qquad (4)$$

Figure 12:
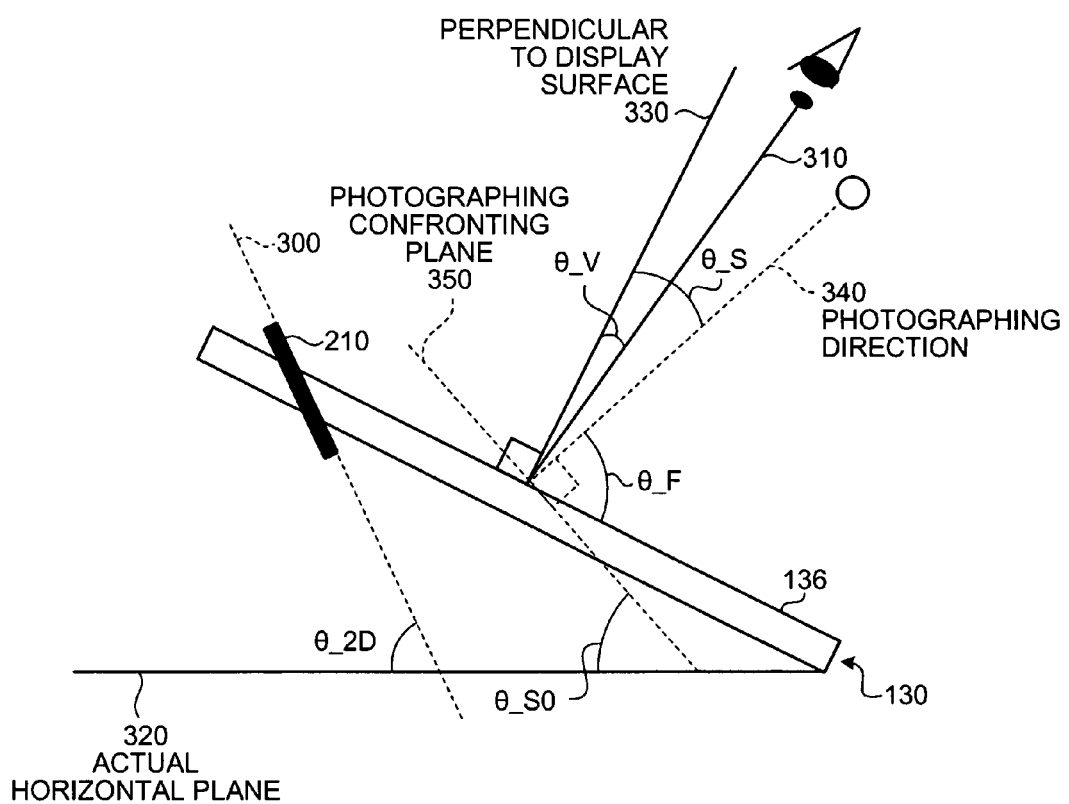
FIG. 12 is a diagram for explaining a display condition where a descending vertical angle of a content is taken into consideration.

When parallax information in both horizontal and vertical directions (x and y directions, respectively) is available, the 2D information should be laid out in consideration of the $\theta\_V$. In the system such as 1D-II and multi-view types, however, where the parallax information in the vertical direction (y direction) is omitted, the 3D image does not change even when the viewing position moves in the y direction. More specifically, when a 3D image is created by combining images that are obtained from different directions (different viewpoint images), the viewpoint images need to be obtained by varying x coordinates and y coordinates in the system of displaying parallax information in both horizontal and vertical directions (x and y directions, respectively). On the other hand, in the system such as the 1D-II and multi-view types where the parallax information is not displayed in the y direction, the y coordinate of the position for obtaining a viewpoint image is fixed to a single value, while the x coordinate is variable. In other words, when observing a 3D image, the image is presented without any distortion if viewed from the y and z coordinates the same as the coordinates at the image obtaining time. However, if the viewing position is shifted in the y or z direction, the viewed 3D image includes some distortion (T. Saishu, et al., SID 04 Digest, pp. 1438-1441, 2004). Hence, for the system that does not have parallax in the vertical direction, the layouts as indicated in FIGS. 6A and 7A can be realized by taking into account the descending vertical angle that is adopted at the time of creating the content. FIG. 12 is a diagram for explaining the display condition in which the descending vertical angle adopted at the time of creating the content is taken into consideration. The descending vertical angle means an angle formed by a photographing direction 340 and the display surface 136, and is shown as $\theta\_F$ in FIG. 12.

If the 3D image displaying apparatus that presents parallax information only in one direction is used as a flatbed type, images should be photographed with a descending vertical angle, as suggested by JP-A 2006-293931 (KOKAI), for example. Moreover, it is preferable for the $\theta\_F$ to be set to 50° to 60°. With such an angle, a solid object is displayed in three dimensions on the flatbed-type 3D display without giving the viewer a feeling of strangeness about the side and top surfaces of the object. In addition, the viewer feels less distortion with this angle even when the viewing direction 310 is far apart from the photographing direction 340.

The angle formed by the photographing direction 340 and the perpendicular 330 of the display surface 136, or in other words, the shift-from-photographing angle ($\theta\_S$) has a relationship with the descending vertical angle ($\theta\_F$) as indicated by the expression (5):

$$\theta\_S = 90° - \theta\_F \quad (5)$$

Thus, because $\theta\_F = 50°$ to 60°, $\theta\_S$ is determined between 40° and 30°. The display condition is determined as expressed by the expression (6).

$$30° \leq \theta\_S \leq 40° \quad (6)$$

The shift-from-photographing angle ($\theta\_S$) is larger than the view angle ($\theta\_V$), and thus the viewing direction 310 needs to be designated to have the viewer take an expected viewing position.

However, once a 3D image is created from images photographed by keeping the angle $\theta\_S$ in a range that satisfies the expression (6), the 3D image displaying method that does not present parallax information in the vertical direction may involve some distortion attributed to the shifted view angle ($|\theta\_S - \theta\_V|$), but the 2D information that satisfies the relationship indicated in FIG. 6B or 7B can be displayed regardless of the view angle ($\theta\_V$). Hence, the display condition of having the viewer take an expected viewing position can be expressed by the expression (7).

$$\theta\_S0 \leq \theta\_2D \quad (7)$$

In the above expression, $\theta\_S0$ is an angle formed by the actual horizontal plane 320 and a photographing confronting plane 350 that has the photographing direction 340 as a perpendicular. This $\theta\_S0$ has a relationship with the display surface angle $\theta\_D$ and the shift-from-photographing angle $\theta\_S$, as expressed by the expression (8).

$$\theta\_S0 = \theta\_S + \theta\_D \quad (8)$$

In accordance with the display condition indicated by (7), the 2D information angle ($\theta\_2D$) can be determined in consideration of the display surface angle ($\theta\_D$) and the shift-from-photographing angle ($\theta\_S$).

$$\theta\_D + \theta\_S \leq \theta\_2D \, (30° \leq \theta\_S \leq 40°) \quad (9)$$

The expression (9) shows that, in comparison to the expression (4), the 2D information can be displayed more effectively when the 2D information is angled more with respect to the display surface.

The 2D information presented with a certain angle formed with respect to the display surface 136 increases the maximum displayable amount of information. The 2D information, most of which is characters, has essential meanings in its shape. The 2D information of an aspect ratio that differs largely from the correct ratio therefore often gives the viewer uncomfortable feeling. Thus, once a certain level of fineness is provided as a condition, the maximum displayable amount of information for the position is determined by bringing the display of the 2D information down to the minimum size, while the aspect ratio of the 2D information is maintained.

When the 2D information is displayed on the 3D image displaying apparatus with an angle formed with respect to a viewing confronting plane that has a line extending in the viewing direction as a perpendicular, the display is slightly flattened in the vertical direction if vector components parallel to the viewing confronting plane are considered. However, the viewer can realize that the display is angled with respect to the viewing confronting plane through one's stereoscopic perceptivity, and thus one's brain can correct it to the appropriate aspect ratio. For this reason, a larger amount of information can be carried in the layout of FIG. 7B than in the layout of FIG. 6B when the two layouts have the same level of fineness and same size of the viewing confronting plane. Such an effect is enhanced as an angle formed by the viewing confronting plane and the virtual plane 300 of the 2D information 210 increases.

However, the condition as expressed by (10) is necessary to prevent the 2D information from being tilted toward the viewer and thereby giving the viewer uncomfortable feeling.

$$\theta\_2D \leq 90° \quad (10)$$

Figure 13:
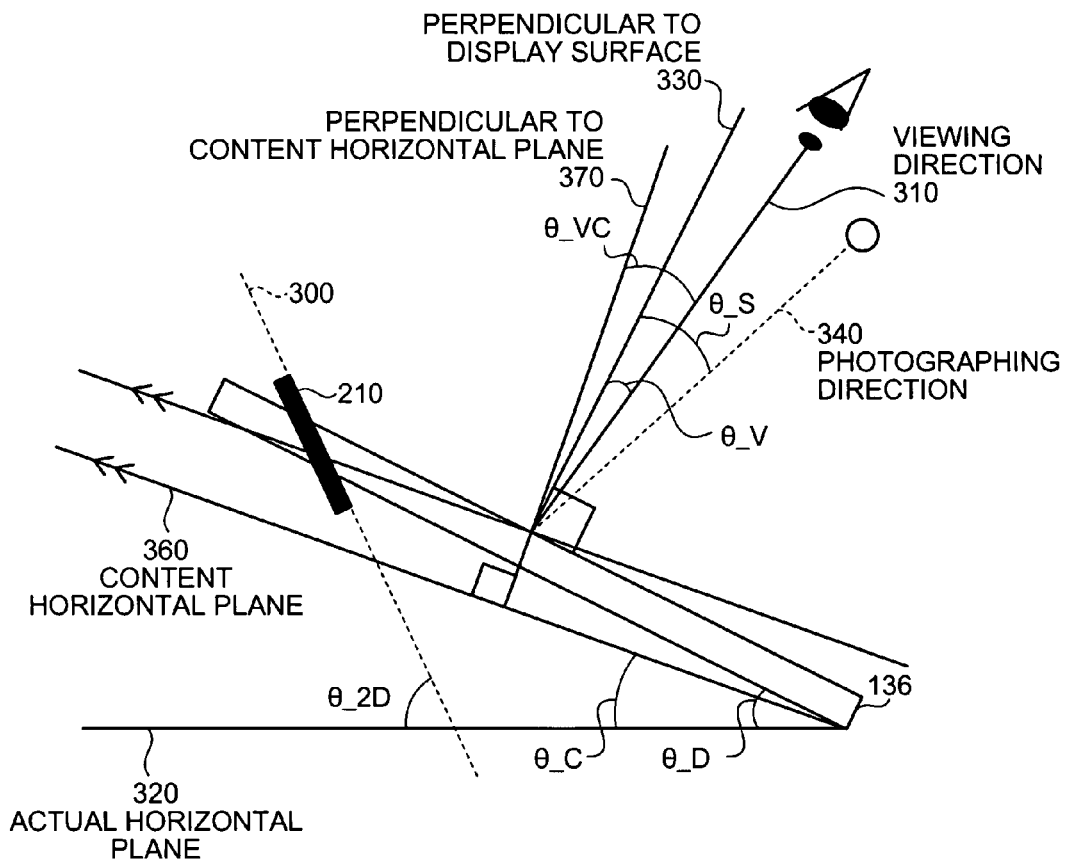
FIG. 13 is a diagram for explaining a display condition where a content horizontal plane is taken into consideration.

A content horizontal plane 360 is a plane tilted with respect to the actual horizontal plane 320, as shown in FIG. 13. It is a virtual horizontal plane in 3D space, on which 3D contents are displayed.

As described earlier, the view angle ($\theta\_V$) becomes larger as the display surface 136 is faced toward the viewer. In other words, the display can be viewed under more appropriate conditions by bringing the view angle ($\theta\_V$) and the shift-from-photographing angle ($\theta\_S$) closer to each other.

However, there still exists a disparity between the two angles. In order to reduce this disparity, the content horizontal plane 360 is brought down to a lower position than the display surface 136, as indicated in FIG. 13. The condition of lowering the content horizontal plane 360 can be expressed by (11).

$$0° \leq \theta\_C < \theta\_D \quad (11)$$

Here, θ_C denotes a content horizontal plane angle, which is formed by the content horizontal plane 360 and the actual horizontal plane 320.

A content shift angle (θ_VC), which is formed by a perpendicular 370 to the content horizontal plane 360 and a line extending in the viewing direction 310 can be expressed by (12).

$$\theta\_VC = \theta\_V + (\theta\_D - \theta\_C) \quad (12)$$

The content shift angle (θ_VC) becomes larger than the view angle (θ_V) by lowering the content horizontal plane 360 with respect to the display surface 136; as indicated by (11). In other words, a disparity between the view angle (θ_V) and the shift-from-photographing angle (θ_S).

For instance, when θ_V=15°, θ_VC becomes 25° by determining (θ_D−θ_C)=10°. In other words, the disparity between θ_V and θ_S (30°≦θ_S≦40°) is lessened.

The content horizontal plane angle (θ_C) is limited in accordance with the display limits on the 3D image displaying apparatus. More specifically, it is preferable that the content horizontal plane 360 defined by the content horizontal plane angle (θ_C) have its entire display area within the display limits. Details are provided in H. Hoshino, F. Okano, H. Isono, and I. Yuyama, J. Opt. Soc. Am. A., Vol. 15, pp. 2059-2065 (1998), NHK.

The display condition of the entire display area falling in the display limits can be expressed by (13).

$$H \times \cos(\theta\_D - \theta\_C) \times \sin(\theta\_D - \theta\_C) \leq Df \quad (13)$$

In the expression, H denotes a screen height, or in other words, the length of the display surface 136 in the y-axis direction, while Df denotes a limit to the depth.

Figure 14A:
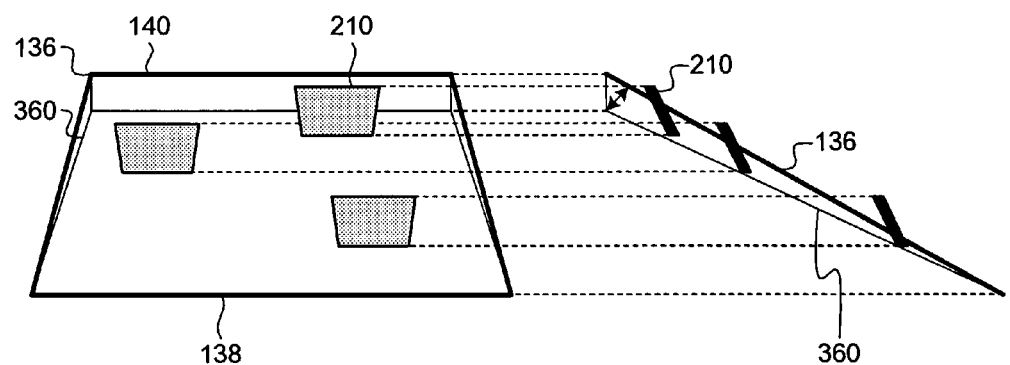
FIG. 14A is a diagram for explaining a limitation in the depth direction.

The display condition (13) in relation to the content horizontal plane angle (θ_C) that has been explained with reference to FIG. 13 is a condition of having the viewer recognize the content horizontal plane as a plane within the depth limit, as indicated in FIG. 14A. In other words, it is a condition of having the viewer recognize the content horizontal plane for a content 210 on a top end 140 of the display surface 136.

Figure 14B:
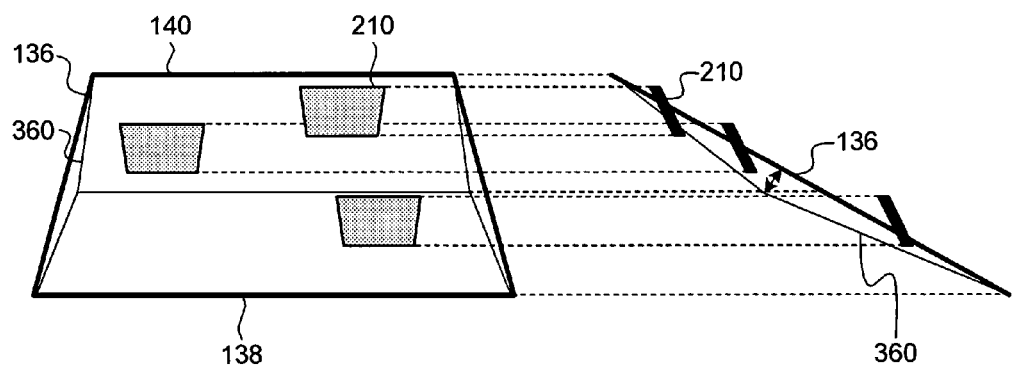
FIG. 14B is a diagram for explaining a limitation in the depth direction.

If the viewer does not really have to recognize the content horizontal plane as a plane on some part of the display surface 136, as illustrated in FIG. 14B, the range of having the viewer recognize the content horizontal plane may be defined within the range of Df.

For example, when mountains as shown on the top end 140 of the display surface 136 or any image uplifted from the content horizontal plane are presented, the content horizontal plane does not have to be recognized.

In the example of FIG. 14B, the content horizontal plane needs to be recognized around the position of a content 210 arranged at the midpoint between the top end 140 and a bottom end 138 of the display surface 136. The content horizontal plane does not have to be recognized in the area closer to the top end 140, however. In this case, H in (13) may be given a small value so that the content horizontal plane angle (θ_C) can be set large.

Figure 15A:
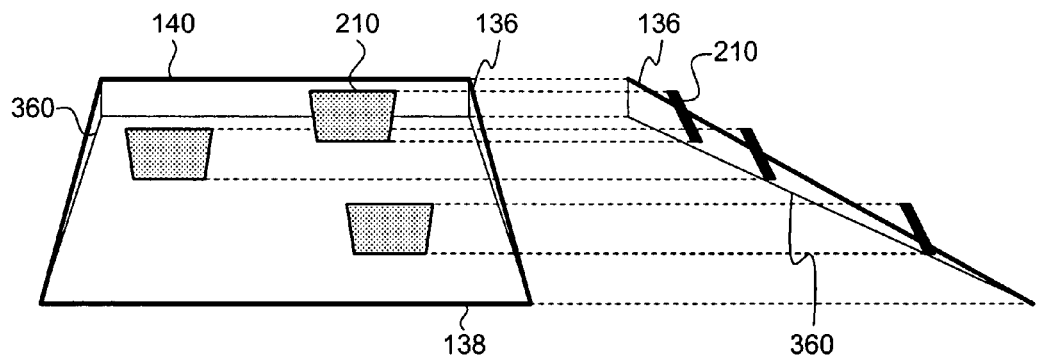
FIG. 15A is a diagram for explaining a relationship between the content horizontal plane and a display area.
Figure 15B:
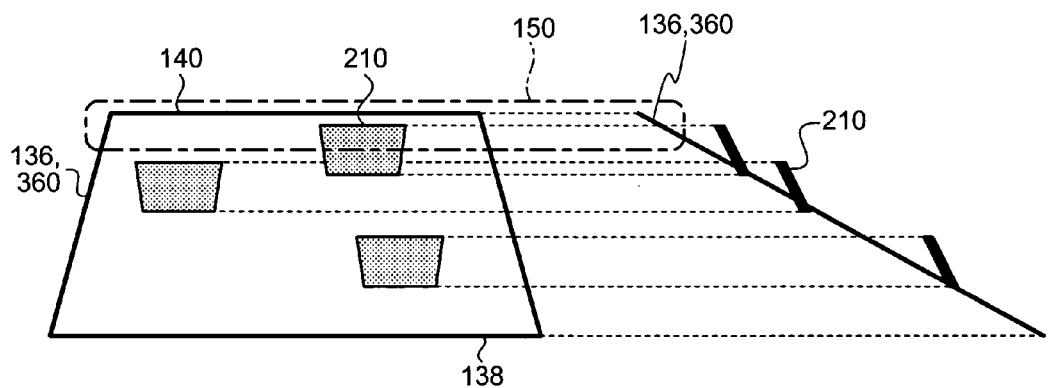
FIG. 15B is a diagram for explaining a relationship between the content horizontal plane and a display area.
Figure 15C:
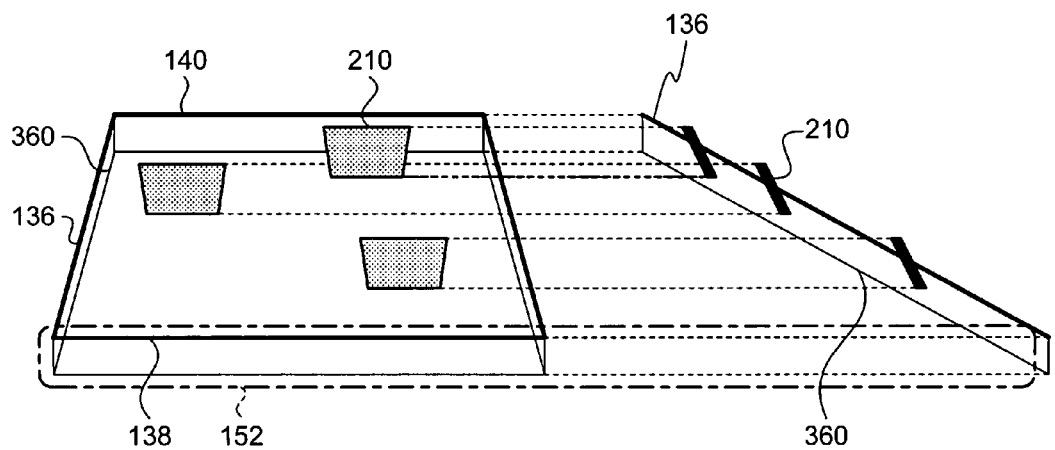
FIG. 15C is a diagram for explaining a relationship between the content horizontal plane and a display area.

By making the content horizontal plane angle (θ_C) smaller than the display surface angle (θ_D), the display area can be more effectively used. FIGS. 15A to 15C are diagrams for explaining the relationships between the content horizontal plane and the display area, illustrating the displays of the 3D image displaying apparatus 10 viewed from the eyes of the viewer. A cross-section of the displaying unit 130 viewed from the x direction is presented on the right hand of each diagram.

FIG. 15A is a diagram showing the display where the relationship between the content horizontal plane angle (θ_C) and the display surface angle (θ_D) is expressed by (14).

$$\theta\_C < \theta\_D \quad (14)$$

The content horizontal plane 360 is determined to meet the display surface 136 at its bottom end 138. The content horizontal plane 360 is designed to be lower than the display surface 136 on the side of the top end 140 thereof, which is the farthest side from the viewer. With such an arrangement, the content horizontal plane 360 can be used fully from the front end to the back end, without being affected by a frame that surrounds the display surface 136.

FIG. 15B is a diagram showing the display where the content horizontal plane angle (θ_C) and the display surface angle (θ_D) has a relationship as expressed by (15), and the display surface 136 coincides with the content horizontal plane 360.

$$\theta\_C = \theta\_D \quad (15)$$

In this arrangement, the top portion of the 3D information in a top area 150 of the display surface 136 is in contact with the frame. Thus, the top area 150 cannot be used for the display of the 3D information or the like.

FIG. 15C is a diagram showing the display where the content horizontal plane angle (θ_C) and the display surface angle (θ_D) has a relationship as expressed by (13), and the content horizontal plane 360 is positioned at the back of the display surface 136 (in the negative direction of the z axis). In this arrangement, the 3D information is hidden under the frame in a bottom area 152 of the display surface 136. The bottom area 152 therefore cannot be used for the display of the 3D information or the like.

By arranging the content horizontal plane 360 in such a manner as to satisfy the relationship expressed by (14), as shown in FIG. 15A, the content horizontal plane 360 can be most effectively used.

Impressive and effective display of the 2D information can be realized when the above display conditions are satisfied. These display conditions are applicable whether or not parallax information in the vertical direction from the viewpoint of the viewer is available. When there is no parallax information in the vertical direction, an image is created by assuming the viewing position of the vertical direction. When there is parallax information in the vertical direction, an image is created also by assuming the main viewing directions. The angle θ_2D should be determined under these conditions to realize the layout of FIG. 6B or 7B. In either case, an assumption needs to be made on the viewing directions to determine θ_2D.

Figure 16:
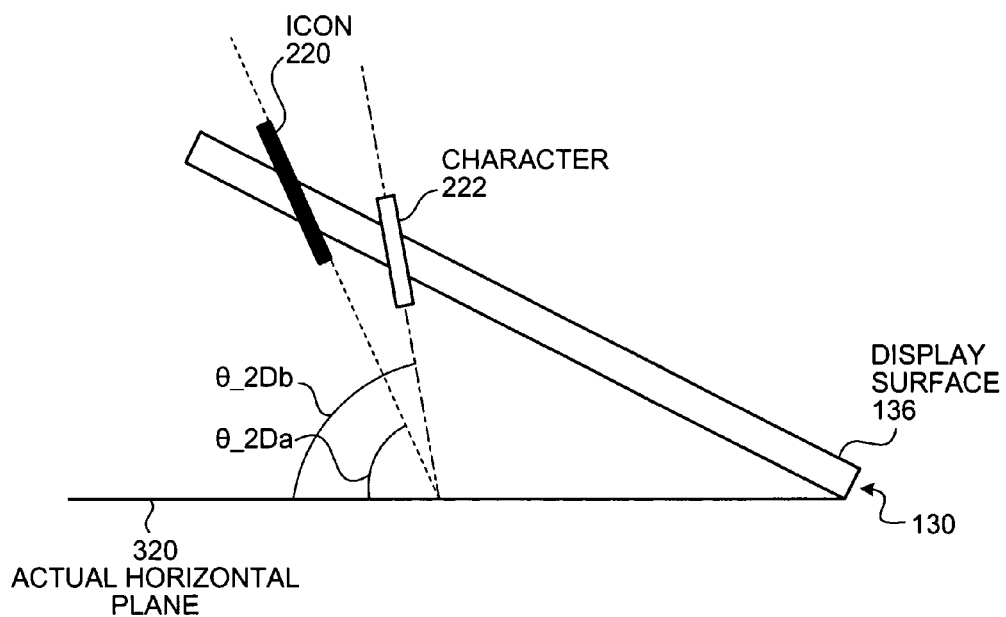
FIG. 16 is a diagram for explaining 2D information angles ($\theta\_2D$) for different types of 2D information.

When 2D information of different types is to be displayed at the same time as illustrated in FIG. 16, different 2D information angles (θ_2Da, θ_2Db) may be adopted in accordance with the types of 2D information. The viewer can thereby recognize the types of 2D information, based on how the pieces of 2D information appear. It should be noted, however, that both the 2D information angles (θ_2D) need to satisfy the above display conditions.

Figure 17:
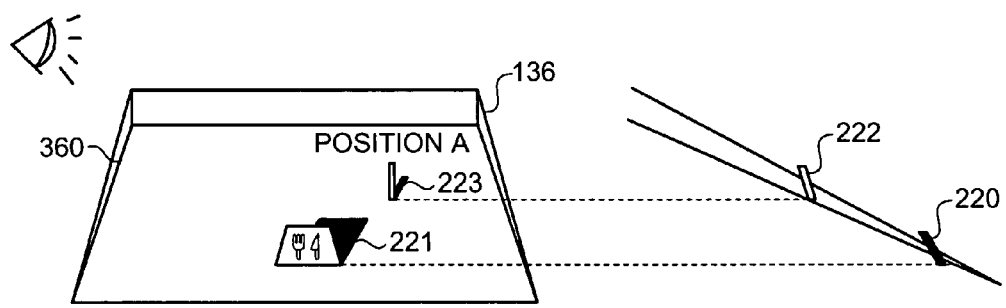
FIG. 17 is a diagram showing shadows 221 and 223 of an icon 220 and a character 222, respectively.

Furthermore, a virtual light source may be set up so that a shadow can be displayed for each piece of 2D information. FIG. 17 is a diagram showing an icon 220 and a character 222 having shadows 221 and 223. When different 2D information angles (θ_2D) are adopted, the pieces of 2D information have shadows of different heights even if the pieces themselves have the same height. In other words, different lengths of shadows of the 2D information help the viewer identify the types of 2D information.

Display conditions for a case in which the 2D information moves in the y direction is explained next. For instance, when a map displaying system such as a car navigation system is realized on the 3D image displaying apparatus 10, 3D images and 2D information displayed on the display surface 136 flow from the back toward the viewer as a transportation means travels. In other words, the display positions of the 3D images and the 2D information continue to change in the negative direction of the y axis. The 2D-information-angle ($\theta\_2D$) determining unit 112 changes the 2D-information-angle ($\theta\_2D$) in a continuous manner in accordance with the movement in the negative direction of the y axis.

Figure 18:
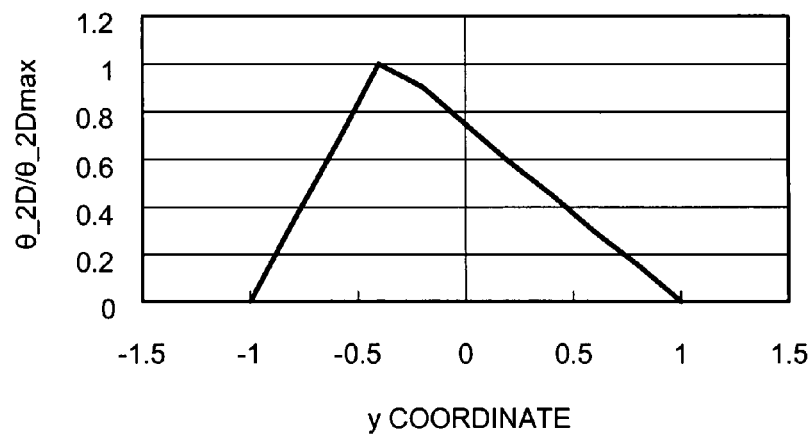
FIG. 18 is a diagram for explaining a relationship between the display position (y coordinate) of the 2D information and a 2D information angle ($\theta\_2D$)
Figure 19:
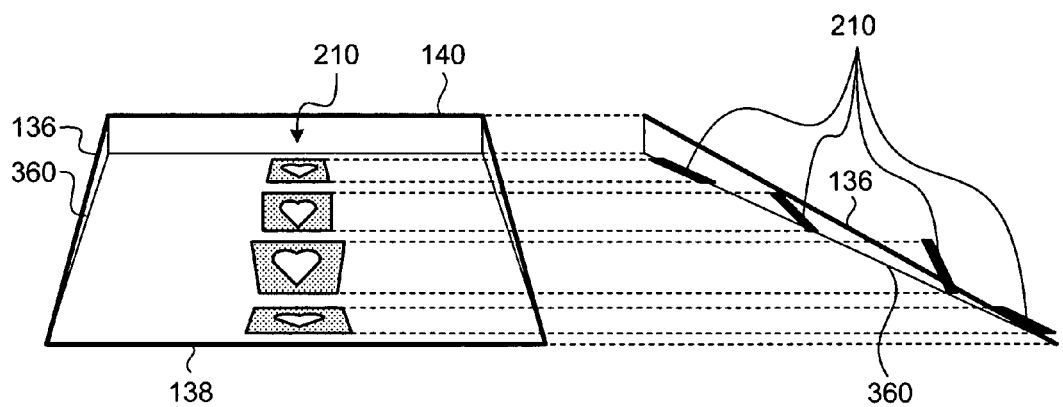
FIG. 19 is a diagram showing the 2D information 210 displayed at the 2D information angle ($\theta\_2D$) determined in correspondence to the display position by the function indicated in FIG. 18.

FIG. 18 is a diagram for explaining the relationship between the display position of the 2D information (y coordinate) and the 2D information angle ($\theta\_2D$). In FIG. 19, pieces of 2D information (icon) 210 are displayed at different 2D information angles ($\theta\_2D$) determined in accordance with their display positions, based on the function indicated in FIG. 18.

The horizontal axis of the graph of FIG. 18 indicates the display position of the 2D information. The y coordinates on the horizontal axis are standardized values, where one-half the height of the display surface 136, or in other words one-half the width in the y direction is set to 1 (y=1). The y coordinate of the center of the display surface 136 is set to 0. The vertical axis of the graph of FIG. 18 indicates the ratio of the 2D information angle ($\theta\_2D$) to its maximum value. The value $\theta\_2Dmax$ may be arbitrarily determined.

The 2D information angle ($\theta\_2D$) of the 2D information that moves from the back toward the front is incremented, starting with $\theta\_2D=\theta\_C$, as shown in FIG. 18. As moving closer to the bottom end 138, or in other words closer to the viewer, the 2D information 210 is gradually raised, as illustrated in FIG. 19. After passing the center position (y=0), the angle $\theta\_2D$ decreases so that the 2D information can be prevented from being taken in by the frame effect when disappearing at the bottom end 138 of the display surface 136. The 2D information is thereby gradually laid back, as illustrated in FIG. 19.

Such movements are given to the 2D information 210 that moves from the back toward the front, in accordance with the display position. This reduces the ratio of the area for information that does not need to draw attention to the projection surface area, and as a result, the efficiency in displaying necessary information is improved. In addition, attention can be naturally drawn from the viewer to a content that should be noted.

As long as the 2D information angle is uniquely determined in correspondence with the display position, the function of the display position of the 2D information and the 2D information angle is not limited to the function used in the embodiment.

Figure 20:
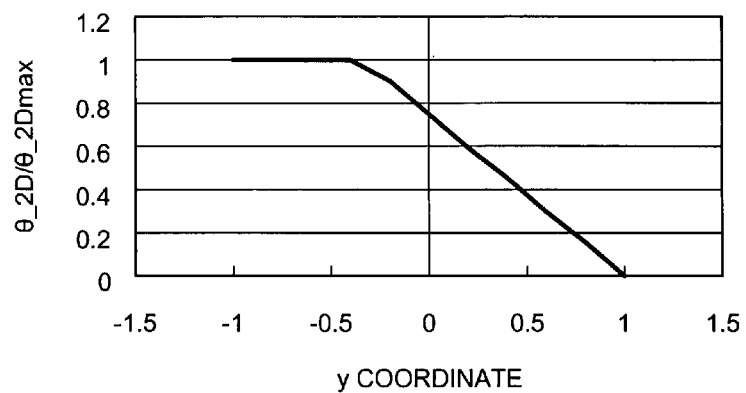
FIG. 20 is a diagram for explaining another example of a relationship between the display position (y coordinate) of the 2D information and the 2D information angle ($\theta\_2D$)

If it does not matter whether the 2D information looks as if being taken in by the frame effect when disappearing on the front side at the bottom end 138, the 2D information moves from the back to the front, as indicated in FIG. 20. Around the point y=−0.5, the angle $\theta\_2D$ reaches its maximum, and thereafter the 2D information is displayed with this angle unchanged.

Figure 21:
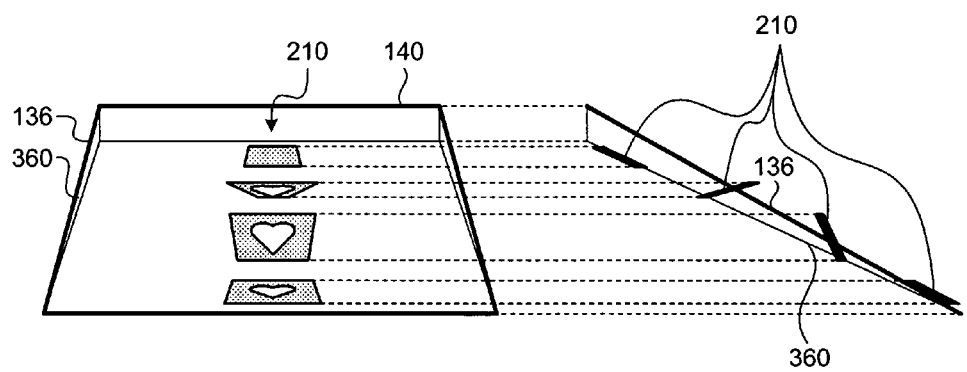
FIG. 21 is a diagram for explaining still another example of a relationship between the display position of the 2D information and the 2D information angle.

In FIG. 21, another example of the 2D information displayed by establishing the relationship between the display position of the 2D information and the 2D information angle is described. As indicated in the example of FIG. 21, the 2D information may be raised in the direction opposite to the direction of the 2D information explained with reference to FIGS. 18 and 19.

Figure 22:
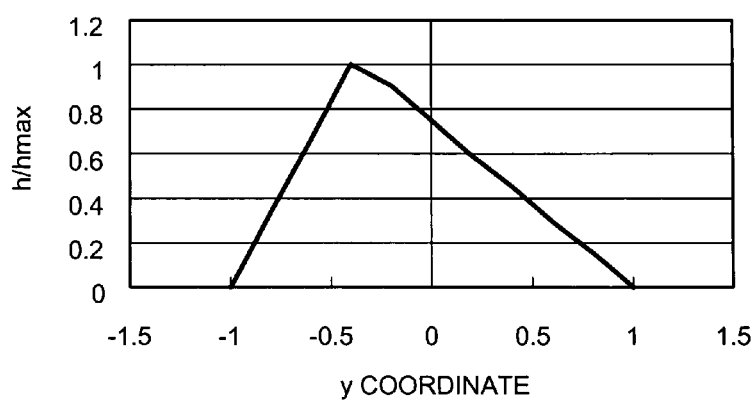
FIG. 22 is a diagram for explaining a relationship between the display position (y coordinate) of the 2D information and a height h of the 2D information.
Figure 23:
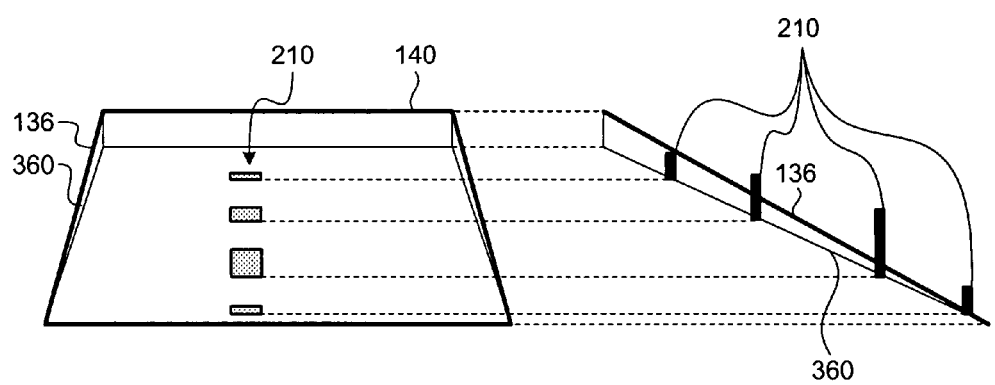
FIG. 23 is a diagram showing the 2D information 210 displayed at a height determined in correspondence to the display position by the function indicated in FIG. 22.

The height (h) determining unit 114 changes the height of the 2D information in a continuous manner as the display position of the 2D information moves in the negative direction of the y axis. FIG. 22 is a diagram for explaining the relationship between the display position of the 2D information (y coordinate) and the height h of the 2D information. In FIG. 23, the 2D information 210 is displayed with a height determined in accordance with each display position by the function indicated in FIG. 22. In still another example, the height of a solid object may also be changed in a continuous manner in accordance with the movement in the y direction.

In a similar manner to the horizontal axis of the graph of FIG. 19, the horizontal axis of the graph of FIG. 22 indicates the display position of the 2D information. The vertical axis of the graph of FIG. 22 indicates the ratio of the height h of the 2D information to the maximum hmax, which can be arbitrarily determined.

The height of the 2D information is gradually increased as shown in FIG. 23 as the 2D information travels from the back toward the front. After passing the center position of the display surface 136, the height is reduced gradually as the 2D information becomes closer to the bottom end 138 so that the 2D information is prevented from being taken in by the frame effect.

In a similar manner to the 2D information angle, the height is changed in accordance with the display position so that the space on the projection surface for the information that is not necessary to draw attention can be reduced.

As a method of dealing with changes of the height (h), the height of the 2D information may be changed, or the z coordinate may be changed while keeping the height of the 2D information unchanged. With the former method, the 2D information looks as if it elongates and contracts. With the latter method, the 2D information looks as if it rises from under the content horizontal plane.

The height (h) determining unit 114 performs the same processing on to the 3D information. In other words, the height of the 3D information is determined by a certain function and changed in a continuous manner in accordance with the display position of the 3D information.

First Embodiment

In accordance with a first embodiment, the 2D-II system is adopted, and a lens array is used. The numbers of parallaxes are set to 4 in the vertical direction and 12 in the horizontal direction. In other words, a lens has a vertical width 4 times larger than the height of a sub-pixel and a horizontal width 12 times larger than the horizontal width of a sub-pixel. The content horizontal plane 360 coincides with the display surface 136. The viewing distance is set to 500 millimeters. When the spatial frequency of the displayed content is 320 cpr, the front-end display limit (Dn) is 16.9 millimeters, and the back-end display limit (Df) is 18.1 millimeters.

In such an arranged 3D image displaying apparatus, it is determined that $\theta\_D=0°$, and the 2D information that mainly contains character information is laid out therein. In consideration of $\theta\_V \leq 10°$, characters and icons are arranged to form an angle of 15° with respect to the display surface of the 3D image displaying apparatus. Multi-view photographing is conducted in such a manner that an angle formed with the display surface (x-y plane) and a line connecting the positions of multiple cameras and the center of the display surface of the 3D image displaying apparatus is θ_S=10° in cross-section y-z.

As a result, the display of the 2D information as illustrated in FIG. 7B is realized. This technique improves the impression of the display even for the 2D information.

Second Embodiment

In accordance with a second embodiment, the 1D-II system is adopted, and an oblique lens is used. The oblique lens is a lens sheet where the ridge of the lens of the lenticular sheet forms an angle with the y axis. An angle θ_formed by the long axis of the optical control element 134 and a line perpendicular to the 2D information display panel 132 satisfies θ=arctan (1/4). By tilting the lens away from the y axis, part of the resolution in the vertical direction can be switched to the resolution in the horizontal direction (e.g., Japanese JP-A 2005-258421 (KOKAI)). Thus, although the horizontal width of the semi-cylinder-shaped lens is 12 times greater than the horizontal width of a sub-pixel, the number of parallaxes can be set to 16. The viewing distance is 450 millimeters.

When the spatial frequency of the content displayed on the 3D image displaying apparatus is set to 320 cpr, the front-end display limit (Dn) is 20.0 millimeters, and the back-end display limit (Df) is 22.0 millimeters. The 3D image displaying apparatus is tilted toward the viewer in such a manner as to set θ_D=20°. Furthermore, to bring the content horizontal plane to meet the display limit at the very back end of the display surface, the angle θ_C is calculated by the expression (14):

$$207.0[mm] \times \cos(20[°]-\theta\_C) \times \sin(20[°]-\theta\_C) \leq 22 [mm]$$

The angle of 24° that satisfies the above condition is obtained.

In this layout, to set the descending vertical angle to 60°, the multi-view photographing is conducted in such a manner that the shift-from-photographing angle (θ_S) formed by the display surface (x-y plane) and the line connecting the multi-camera position and the center of the display surface of the 3D image displaying apparatus in cross-section y-z satisfies:

$$\theta\_S=24[°](=(90[°]-\theta\_F)-(\theta\_D-\theta\_C)=(90[°]-60[°])-(30[°]-24[°]))$$

In this layout, the 2D information such as character information and icon information is arranged with θ_2D=70° so that $$\theta\_2D>(90[°]-\theta\_S)=66[°]$$

is satisfied. The display as illustrated in FIG. 7B is thereby realized. Impressive display of the 2D information can be accomplished because of such an arranged 3D image displaying apparatus.

Third Embodiment

According to a third embodiment, a multi-view system is adopted, and a vertical lens is used. The number of parallaxes is 12, and the viewing distance is 500 millimeters. Because a light focusing point appears at the viewing distance in the multi-view system, the horizontal width of the lens is determined to be slightly smaller than the horizontal width of a sub-pixel. Twelve multi-view cameras are adopted to agree with the number of parallaxes. When the spatial frequency of the content displayed on the 3D image displaying apparatus is 320 cpr, the front-end display limit (Dn) is 16.9 millimeters, while the back-end display limit (Df) is 18.1 millimeters. The 3D image displaying apparatus is tilted toward the viewer at the angle θ_D=25°. In addition, to make the content horizontal plane coincide with the display limit at the very back of the display surface, θ_C=20° is obtained to satisfy (14):

$$207.0[mm] \times \cos(25[°]-\theta\_C) \times \sin(25[°]-\theta\_C) \leq 18.1 [mm]$$

In this layout, to set the descending vertical angle to 55°, the multi-view photographing is conducted by determining the shift-from-photographing angle (θ_S) formed by the display surface (x-y plane) and the line connecting the multi-camera position and the center of the display surface of the 3D image displaying apparatus in cross-section y-z as:

$$\theta\_S=30[°](=(90[°]-\theta\_F)-(\theta\_D-\theta\_C)=(90[°]-55[°])-(25[°]-20[°]))$$

In this layout, θ_2D is set to 62° so that the 2D information such as character information and icon information is laid out to satisfy:

$$\theta\_2D>(90[°]-\theta\_S)=60[°]$$

The display as illustrated in FIG. 7B is thereby realized. Impressive display of the 2D information can be achieved because of such an arranged 3D image displaying apparatus.

Furthermore, the 2D information angles (θ_2D) for characters and icons are changed in accordance with the y coordinates, based on FIG. 18, where θ_2Dmax is set to 62°. As a result, the display that involves changes as shown in FIG. 19 is realized. Important information can be thereby effectively displayed.

Fourth Embodiment

According to a fourth embodiment, the multi-view system is adopted, and an oblique lens is used. The oblique lens is determined as θ=arctan (1/4). Because of this lens, although its horizontal width is the same as that of the third embodiment, 16 parallaxes, which are 4/3 times more than the third embodiment, are provided. The viewing distance is 450 millimeters. Because a light focusing point appears at the viewing distance in the multi-view system, the number of multi-view cameras is agreed with the number of parallaxes, 16. When the spatial frequency of the content displayed on the 3D image displaying apparatus is 320 cpr, the front-end display limit (Dn) is 20.0 millimeters, while the back-end display limit (Df) is 22.0 millimeters.

The 3D image displaying apparatus is tilted toward the viewer at the angle θ_D=15°. To make the content horizontal plane coincide with the display limit at the very back of the display surface, θ_C=9° is obtained by (13):

$$207.0[mm] \times \cos(15[°]-\theta\_C) \times \sin(15[°]-\theta\_C) \leq 22.0 [mm]$$

In this layout, to set the descending vertical angle to 60°, the multi-view photographing is conducted by determining the shift-from-photographing angle (θ_S) formed by the display surface (x-y plane) and the line connecting the multi-camera position and the center of the display surface of the 3D image displaying apparatus in cross-section y-z as:

$$\theta\_S=24[°](=(90[°]-\theta\_F)-(\theta\_D-\theta\_C)=(90[°]-60[°])-(15[°]-9[°]))$$

In this layout, θ_2D is set to 70° so that the 2D information such as character information and icon information is laid out to satisfy:

$$\theta\_2D>(90[°]-\theta\_S)=66[°]$$

The display as illustrated in FIG. 7B is thereby realized. Impressive display of the 2D information can be achieved because of such an arranged 3D image displaying apparatus.

In addition, the 2D information is changed in accordance with the y coordinate on the screen. More specifically, H is varied in the same manner as changes of the angle θ_2D indicated in FIG. 18. As a result, the display that involves changes as in FIG. 23 is realized, and important information can be effectively displayed.

The present invention has been explained by referring to the embodiments. However, various changes and modifications may be added to these embodiments.

One modification may be such that when the 2D information angle (θ_2D) that satisfies the above display conditions is determined in advance, the 3D image displaying apparatus 10 may maintain the 2D information angle (θ_2D) and use it to display the 2D information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of displaying a 3D image on an image displaying apparatus that can produce a parallax in at least one direction, comprising:

displaying by a controlling unit 2D information, viewed as a 2D content, on a displaying unit so that a 2D information angle (θ_2D) formed with a virtual display surface of the 2D information and a real horizontal plane satisfies:

$$\theta\_D < \theta\_2D \leq 90°, \text{wherein}$$

a surface of the image displaying apparatus is arranged at an angle (θ_D) formed with the real horizontal plane in a real space, where $$0° \leq \theta\_D < 90°, \text{wherein}$$

the controlling unit displays the 3D image on the displaying unit so that an angle θ_S0 formed by the real horizontal plane and a photographing confronting plane perpendicular to a photographing direction of a camera for creating the 3D image (0°<θ_S0<90°) satisfies:

θ_D<θ_S0, wherein the photographing confronting plane is not parallel to the virtual display surface of the 2D information, and the displaying unit displays the 2D information in such a manner that the 2D information angle (θ_2D) satisfies:

$$\theta\_S0 < \theta\_2D.$$

2. The method according to claim 1, wherein the controlling unit displays the 2D information on the displaying unit so that the 2D information angle (θ_2D) satisfies:

$$\theta\_D + \theta\_V \leq \theta\_2D,$$

when a view angle formed by a perpendicular line to the surface and a line extending in a viewing direction of the viewer is θ_V (0°<θ_V<90°).

3. The method according to claim 2, wherein the view angle (θ_V) satisfies:

$$0° < \theta\_V < 25°.$$

4. The method according to claim 1, wherein the controlling unit displays the 2D information on the displaying unit so that an angle θ_C formed by the real horizontal plane and a content horizontal plane that is a horizontal plane in a virtual 3D space in which the 3D image is displayed satisfies:

$$0° < \theta\_C < \theta\_D.$$

5. The method according to claim 4, wherein the controlling unit displays the 2D information that satisfies:

$$H \times \cos(\theta\_D - \theta\_C) \times \sin(\theta\_D - \theta\_C) \leq Df$$

where a height of the surface is H, and a depth limit is Df.

6. The method according to claim 1, wherein the controlling unit displays the 2D information of different kinds at different 2D information angles (θ_2D) on the displaying unit.

7. The method according to claim 1, wherein the controlling unit displays a shadow of the 2D information cast by a light source that is assumed in advance, together with the 2D information on the displaying unit.

8. The method according to claim 1, wherein
   a 2D-information-angle determining unit determines the 2D information angle (θ_2D) for each display position based on the display position of the 2D information when the 2D information moves on the surface; and
   the controlling unit displays the 2D information at the 2D information angle (θ_2D) determined by the 2D-information-angle determining unit in each display position.

9. The method according to claim 8, wherein the 2D-information-angle determining unit determines the 2D information angle (θ_2D) of the 2D information based on the display position in a perpendicular direction of the surface.

10. The method according to claim 8, wherein
    a first-function storage unit stores a first function that indicates a relationship between the display position of the 2D information and the 2D information angle (θ_2D); and
    the 2D-information-angle determining unit determines the 2D information angle (θ_2D) for each display position, based on the first function stored in the first-function storage unit.

11. The method according to claim 10, wherein
    the first-function storage unit stores a plurality of first functions for different types of the 2D information; and
    the 2D-information-angle determining unit determines the 2D information angle (θ_2D) of the 2D information of a type for each display position, based on a first function that corresponds to the type of the 2D information.

12. The method according to claim 1, wherein
    a height determining unit determines a height of the 2D information at each display position based on the display position of the 2D information when the 2D information moves on the surface; and
    the controlling unit displays the 2D information at the height of the 2D information determined by the height determining unit in each display position on the displaying unit.

13. The method according to claim 12, wherein the height determining unit determines the height of the 2D information based on the display position in the perpendicular direction of the surface.

14. The method according to claim 12, wherein
    a second-function storage unit stores a second function that indicates a relationship between the display position of the 2D information and the height of the 2D information; and
    the height determining unit determines the height of the 2D information at each display position based on the second function stored in the second-function storage unit.

15. The method according to claim 14, wherein
    the second-function storage unit stores a plurality of second functions for different types of 2D information; and the height determining unit determines the height of the 2D information for a type of the 2D information at each display position based on a second function that corresponds to the type of the 2D information.

16. The method according to claim 12, wherein the height determining unit determines a height of 3D information at each display position based on a display position of the 3D information when the 3D information moves on the surface.

17. A 3D image displaying apparatus that can produce a parallax in at least one direction, comprising:

a surface of the image displaying apparatus that is arranged at an angle ($\theta\_D$) formed with a real horizontal plane in a real space, where $$0°\leq\theta\_D<90°; \text{ and}$$

a controlling unit that displays 2D information, viewed as a 2D content, on a displaying unit so that a 2D information angle ($\theta\_2D$) formed with a virtual display surface of the 2D information and the real horizontal plane satisfies:

$$\theta\_D<\theta\_2D\leq90°, \text{ wherein}$$

the controlling unit displays the 3D image on the displaying unit so that an angle $\theta\_S0$ formed by the real horizontal plane and a photographing confronting plane perpendicular to a photographing direction of a camera for creating the 3D image ($0°<\theta\_S0<90°$) satisfies:

$\theta\_D<\theta\_S0$, wherein the photographing confronting plane is not parallel to the virtual display surface of the 2D information, and the displaying unit displays the 2D information in such a manner that the 2D information angle ($\theta\_2D$) satisfies: $\theta\_S0<\theta\_2D$.

* * * * *